(12) United States Patent
Xu et al.

(10) Patent No.: US 11,696,189 B2
(45) Date of Patent: Jul. 4, 2023

(54) HANDOVER MECHANISM FOR NON-TERRESTRIAL NETWORK (NTN) SYSTEM IN 5G NEW RADIO (NR)

(71) Applicant: QUALCOMM Incorporated, San Diego, CA (US)

(72) Inventors: Huilin Xu, San Diego, CA (US); Qiang Wu, San Diego, CA (US); Jun Ma, San Diego, CA (US); Xiao Feng Wang, San Diego, CA (US); Iyab Issam Sakhnini, San Diego, CA (US); Dan Zhang, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/134,884

(22) Filed: Dec. 28, 2020

(65) Prior Publication Data

US 2021/0250816 A1    Aug. 12, 2021

Related U.S. Application Data

(60) Provisional application No. 62/971,592, filed on Feb. 7, 2020.

(51) Int. Cl.
*H04W 36/00*    (2009.01)
*H04W 60/04*    (2009.01)
*H04B 7/185*    (2006.01)

(52) U.S. Cl.
CPC .... *H04W 36/0016* (2013.01); *H04B 7/18508* (2013.01); *H04B 7/18541* (2013.01);
(Continued)

(58) Field of Classification Search
CPC ..... H04W 84/06; H04W 36/14; H04W 12/06; H04W 36/08; H04W 76/10; H04W 48/18;
(Continued)

(56) References Cited

U.S. PATENT DOCUMENTS

| 5,561,838 A | * | 10/1996 | Chandos | ............ | H04B 7/18589 |
| | | | | | 455/12.1 |
| 2014/0211763 A1 | * | 7/2014 | Choi | ...................... | H04W 36/20 |
| | | | | | 370/332 |

(Continued)

FOREIGN PATENT DOCUMENTS

| WO | WO-2012004786 A2 | * | 1/2012 | ............ H04W 4/046 |
| WO | WO-2015123623 A1 | * | 8/2015 | ............... H01Q 3/08 |
| WO | WO-2017023576 A1 | | 2/2017 | |

OTHER PUBLICATIONS

Koutsopoulos et al. ("Reliable Handover Prediction and Resource Allocation in MEO Mobile Satellite Networks"). (Year: 1999).*

(Continued)

*Primary Examiner* — Dung Hong
(74) *Attorney, Agent, or Firm* — Norton Rose Fulbright US LLP

(57) ABSTRACT

This disclosure provides systems, methods, and apparatus, including computer programs encoded on computer storage media, for wireless communication via a non-terrestrial network (NTN). In one aspect, a method for wireless communication includes initiating, by a user equipment (UE), a registration process with a network entity of an NTN to access the NTN. The method further includes transmitting, by the UE to the network entity, UE capability information of the UE. Other aspects and features are also claimed and described.

50 Claims, 11 Drawing Sheets

(52) U.S. Cl.
CPC ... *H04W 36/0058* (2018.08); *H04W 36/0072* (2013.01); *H04W 60/04* (2013.01)

(58) Field of Classification Search
CPC ......... H04W 36/0058; H04W 36/0016; H04W 36/0066; H04B 7/1853; H04B 7/18541; H04B 7/1851; H04B 17/382
See application file for complete search history.

(56) References Cited

U.S. PATENT DOCUMENTS

| | | | |
|---|---|---|---|
| 2017/0230104 A1* | 8/2017 | Purkayastha | H04B 7/2041 |
| 2018/0284149 A1* | 10/2018 | Kommi | G01C 21/165 |
| 2021/0297923 A1* | 9/2021 | Wei | H04W 48/12 |

OTHER PUBLICATIONS

Interdigital: "Conditional Measurement Configuration for LEO NTN", 3GPP Draft, 3GPP RAN WG2 Meeting #108, R2-1915770, 3rd Generation Partnership Project (3GPP), Mobile Competence Centre, 650, Route Des Lucioles, F-06921 Sophia-Antipolis Cedex, France, vol. RAN WG2, No. Reno, USA; Nov. 18, 2019-Nov. 22, 2019, Nov. 7, 2019 (Nov. 7, 2019), XP051816081, 2 Pages, Retrieved from the Internet: URL: https://ftp.3gpp.org/tsg_ran/WG2_RL2/TSGR2_108/Docs/R2-1915770.zip. R2-1915170 Conditional Measurement Configuration for LEO NTN (R16 NTN SI AI 6.6.4.1). docx [retrieved on Nov. 7, 2019] the whole document.
International Search Report and Written Opinion—PCT/US2020/067267—ISA/EPO—dated Apr. 22, 2021 (201989WO).

* cited by examiner

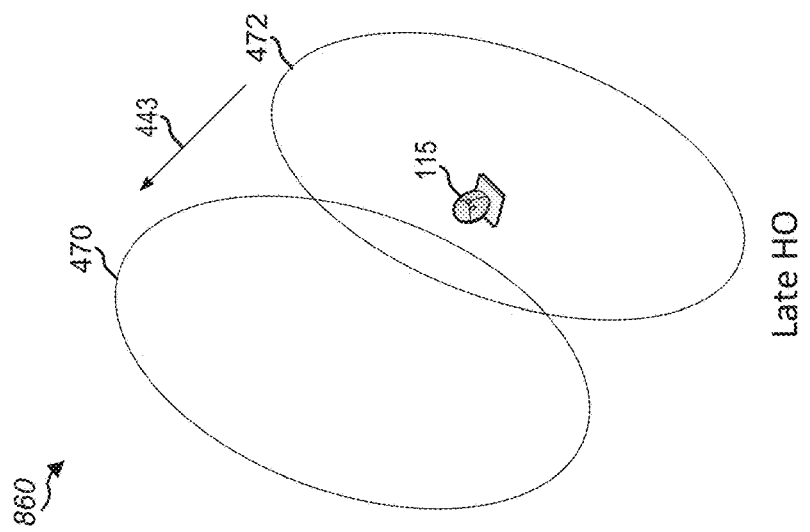
FIG. 8C  Late HO
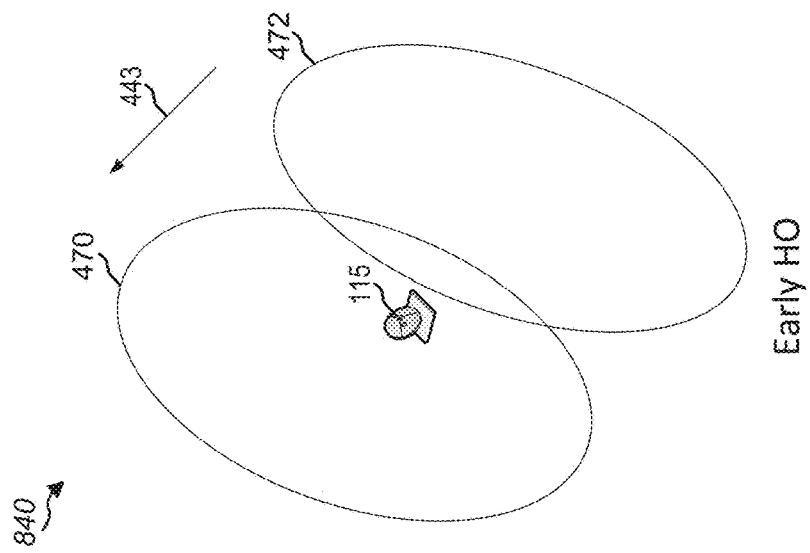
FIG. 8B  Early HO
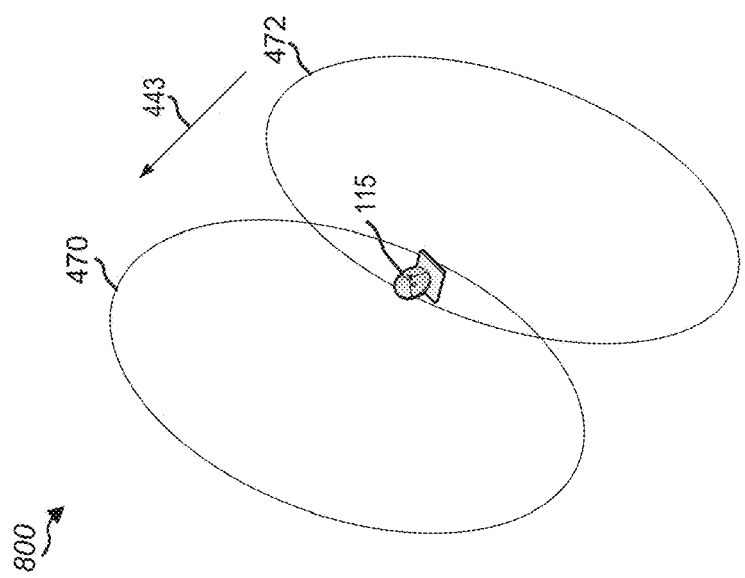
FIG. 8A  Target timing for HO

HANDOVER MECHANISM FOR NON-TERRESTRIAL NETWORK (NTN) SYSTEM IN 5G NEW RADIO (NR)

CROSS-REFERENCE TO RELATED APPLICATIONS

This application claims the benefit of U.S. Provisional Patent Application No. 62/971,592, entitled, "HANDOVER MECHANISM FOR NON-TERRESTRIAL NETWORK (NTN) SYSTEM IN 5G NEW RADIO (NR)," filed on Feb. 7, 2020 which is expressly incorporated by reference herein in its entirety.

TECHNICAL FIELD

Aspects of the present disclosure relate generally to wireless communication systems, and more particularly, but without limitation, to a handover operation in a non-terrestrial network (NTN).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources (e.g., time, frequency, and power). Such networks, which are usually multiple access networks, support communications for multiple users by sharing the available network resources. Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-S-OFDM).

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Some wireless communications systems (e.g., non-terrestrial wireless networks (NTNs)) may utilize satellites and/or high-altitude platforms as relay devices between mobile terminals (e.g. a user equipment) and ground gateways. In NTNs, satellites travel at fixed speed on pre-determined orbital planes. The ground beams may be fixed in shape and size, depending on a satellite antenna design. The ground beams pass through certain location at fixed times that are known to the network. Unlike in a cellular network, where a user equipment (UE) in general has omni-directional antenna and does not need to repoint antenna(s) during handover (HO), an NTN UE has high-gain narrow-beam antenna. Depending on the antenna type, it may take up to several seconds for a UE to repoint antenna to a different satellite. This leads to longer HO preparation time and outage during HO. Additionally, requiring a terminal in an NTN to perform measurements (e.g., a signal quality) of available beams (e.g., satellite beams) for a handover would require the terminal to switch the UE beam direction and cause service interruptions to the terminal.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication including determining, by a network entity of a non-terrestrial network (NTN), a target handover time based on a location of a user equipment (UE) in the NTN. The target handover time associated with a time for the UE to perform a handover operation from a first beam to a second beam. The method further includes transmitting, from the network entity, a handover command to the UE. The handover command includes a handover time indicator corresponding to the target handover time.

In an additional aspect of the disclosure, an apparatus for wireless communication including means for determining, by a network entity of an NTN, a target handover time based on a location of a UE in the NTN. The target handover time associated with a time for the UE to perform a handover operation from a first beam to a second beam. The apparatus also includes means for transmitting, from the network entity, a handover command to the UE. The handover command includes a handover time indicator corresponding to the target handover time.

In an additional aspect of the disclosure, a non-transitory computer-readable medium having program code recorded thereon. The program code further includes code to determine, by a network entity of an NTN, a target handover time based on a location of a UE in the NTN. The target handover time associated with a time for the UE to perform a handover operation from a first beam to a second beam. The code is further configured to initiate transmission of a handover command from the network entity to the UE. The handover command includes a handover time indicator corresponding to the target handover time.

In an additional aspect of the disclosure, an apparatus configured for wireless communication is disclosed. The apparatus includes at least one processor, and a memory coupled to the processor. The processor is configured to determine, by a network entity of an NTN, a target handover time based on a location of a UE in the NTN. The target handover time associated with a time for the UE to perform a handover operation from a first beam to a second beam.

The processor is further configured to initiate transmission of a handover command from the network entity to the UE. The handover command includes a handover time indicator corresponding to the target handover time.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to determine, by a network entity of an NTN, a target handover time based on a location of a UE in the NTN. The target handover time associated with a time for the UE to perform a handover operation from a first beam to a second beam. The processor system is further configured to initiate transmission of a handover command from the network entity to the UE. The handover command includes a handover time indicator corresponding to the target handover time.

In an additional aspect of the disclosure, a method for wireless communication includes initiating, by a UE, a registration process with a network entity of an NTN to access the NTN. The method further includes transmitting, by the UE to the network entity, UE capability information of the UE.

In an additional aspect of the disclosure, an apparatus for wireless communication includes means for initiating, by a UE, a registration process with a network entity of an NTN to access the NTN. The apparatus further includes means for transmitting, by the UE to the network entity, UE capability information of the UE.

In an additional aspect of the disclosure a non-transitory computer-readable medium having program code recorded thereon. The program code further includes code to initiate, by a UE, a registration process with a network entity of an NTN to access the NTN, and initiate transmission, by the UE to the network entity, UE capability information of the UE.

In an additional aspect of the disclosure, an apparatus configured for wireless communication is disclosed. The apparatus includes at least one processor, and a memory coupled to the processor. The processor is configured to initiate, by a UE, a registration process with a network entity of an NTN to access the NTN, and initiate transmission, by the UE to the network entity, UE capability information of the UE.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to initiate, by a UE, a registration process with a network entity of an NTN to access the NTN, and initiate transmission, by the UE to the network entity, UE capability information of the UE.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 8A, 8B, and 8C include illustrations of examples of handovers for a NTN according to aspects of the present disclosure.

DETAILED DESCRIPTION

Figure 1:
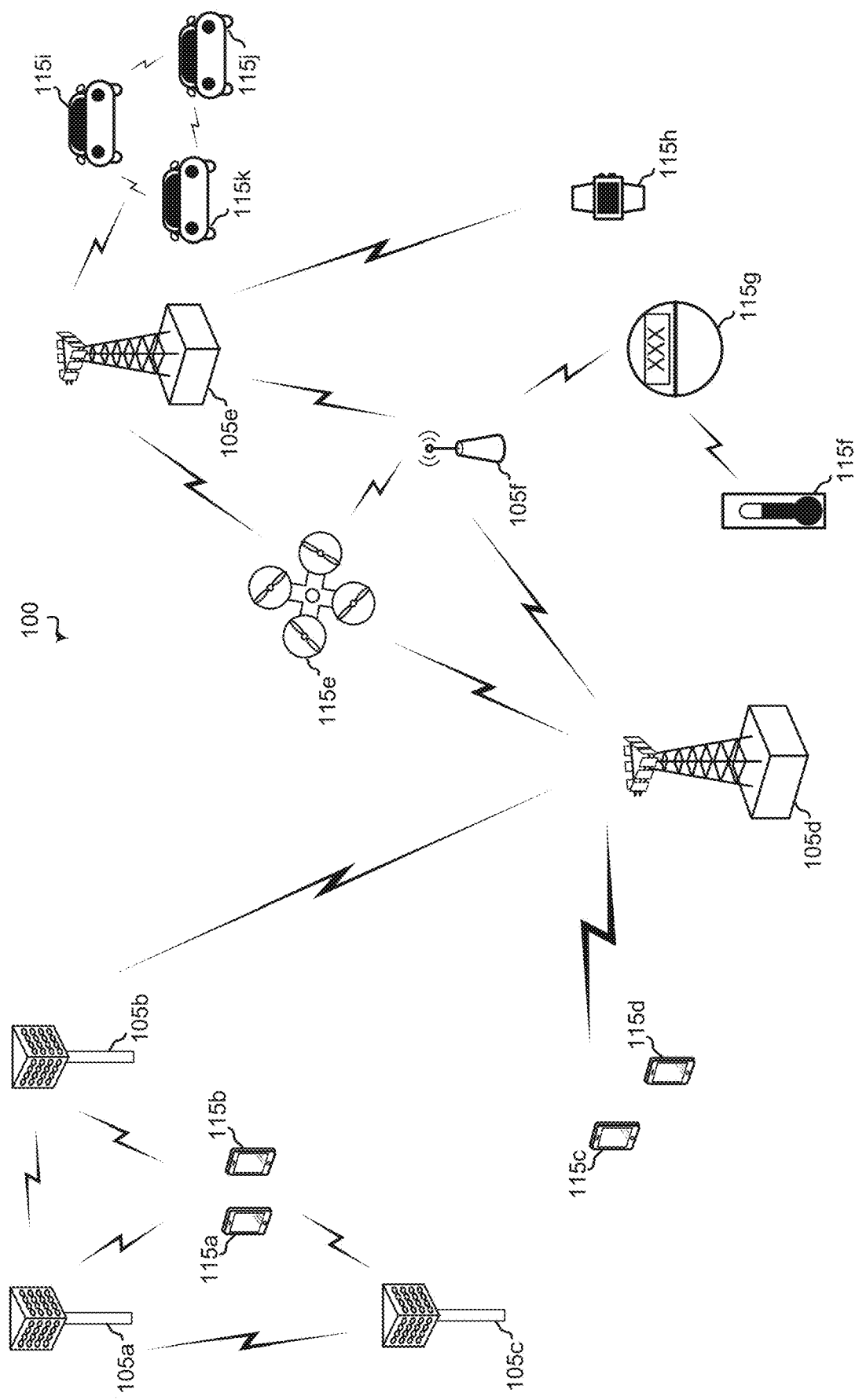
FIG. 1 is a block diagram illustrating details of a wireless communication system according to some aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

In the present disclosure, various aspects and techniques for communication in a non-terrestrial network (NTN) are disclosed. The NTN may include a network entity and a user equipment (UE) (e.g., a terminal). The network entity may include or correspond to a base station, a platform, a high-altitude platform, satellite, space stations, aircraft, drone, balloon, or any orbital or suborbital device capable of performing wireless communications (e.g., with a ground terminal or ground gateway). In implementations where the network entity is a platform, the network entity may travel according to a known or predetermined path with a known or predetermined speed(s), such as an orbit having a fixed speed on pre-determined orbital planes. In some implementations, travel (e.g., a travel path or travel plan) of the platform may be represented or stored as a model. The platform may be configured to provide one or more beams that are usually fixed in shape and size, depending on an antenna design. Based on the travel of the platform, the one or more beams pass through certain location(s) at fixed times that are known to the network, such as other network entities. The UE, such as an NTN UE, may include a high-gain narrow-beam antenna. Depending on the antenna type, a steering type, or a combination thereof, it may take up to several seconds for an UE to repoint antenna to different beams of the platform, different platforms, or both, which may contribute to in longer HO preparation time and outage during HO as compared to handover in in cellular network in which a UE is typically equipped with an omni-directional antenna and does not need to repoint antenna(s) during a handover (HO) procedure.

The described techniques relate to improved methods, systems, devices, and apparatuses that support communication and HO operations in wireless systems, such as an NTN. To illustrate, the UE may perform a registration process with a network entity of NTN to access the NTN. Additionally, the UE may transmit the location data, the capability information, the mobility information, or a combination thereof, to the network entity. In some implementations, the UE transmits the location data, the capability information, the mobility information, or a combination thereof to the network entity during the registration process. Additionally, or alternatively, the UE may transmit the location data, the capability information, the mobility information, or a combination thereof responsive to a request received from the network entity.

The network entity may access a model corresponding to a first platform, such as a platform from which a first beam originates, a platform from which a second beam originates, or a combination thereof. The network entity may determine target HO time based on the model and based on the location data, the capability information, the mobility information, or a combination thereof. The target handover time may be associated with a time for the UE to perform a handover operation from a first beam to a second beam. The target handover time is determined independent of a measurement report from the UE before handover, the measurement report corresponding to the first beam or the second beam. Additionally, or alternatively, the target handover time may correspond to an optimal time for the UE to perform the handover operation from the first beam to the second beam. In some implementations, to determine or calculate the target HO time, the network entity may consider movement of the UE to stationary. Additionally, or alternatively, the network entity may determine or calculate the target HO time independent of a measure signal quality of the network as determined by the UE for the first beam, the second beam, or both.

The network entity transmits a handover command to the UE. In some implementations, the handover command may include or correspond to a Radio Resource Control (RRC) configuration message. The handover command includes a handover time indicator corresponding to the target handover time. Based on the handover time indicator, the UE detects a time corresponding to the HO time indicator and performs a HO procedure to switch from the first beam to the second beam. For example, the UE may perform an intra-satellite handover or an inter-satellite handover.

In some implementations, the UE may generate a measurement report. To illustrate, the UE may measure the downlink signal strength and/or the down link signal quality of the first beam at a first time prior to or during the HO procedure, measure the downlink signal strength and/or the down link signal quality of the subsequent beam at a second time during or subsequent to the HO procedure. The UE may generate a measurement report periodically, randomly, based on a request received from a network entity, or a combination thereof. The UE may transmit the measurement report to the network entity. For example, the UE may send the measurement report that includes a location of the UE at the first time, a location of the UE at the second time, the downlink signal strength and/or the down link signal quality of the first beam at the first time, the downlink signal strength and/or the down link signal quality of the subsequent beam at the second time, or a combination thereof. The network entity may receive the measurement report and may generate an updated model based on the measurement report. To illustrate, based on the measurement report, the network entity may determine that the first beam or the second beam has shifted, determine an antenna pointing error, or both. The network entity may update the model based on an amount of shift, the antenna pointing error, or a combination thereof to generate and updated model. The updated model may be used to calculate one or more target HO times.

Thus, present disclosure provides a HO process (e.g., a NTN HO process) to reduce overhead associated with HO for fast moving platforms, such as a satellite (SAT) moving at 7 kilometers (km)/second, while maintaining high mobility performance. By utilizing a fixed beam pattern and/or a model of the beam pattern and travel path, the NTN (e.g., one or more network entities) can determine when beam crossover should occur and derive a HO time for the UE without needing to receive a measurement report from the UE. It is noted that the UE measurement report may be useful to enable the network to calibrate network's knowledge of an individual beam pattern(s).

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999/reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like. In some implementations of wireless network 100, at least one base station 105 may include an Earth ground station of a NTN.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
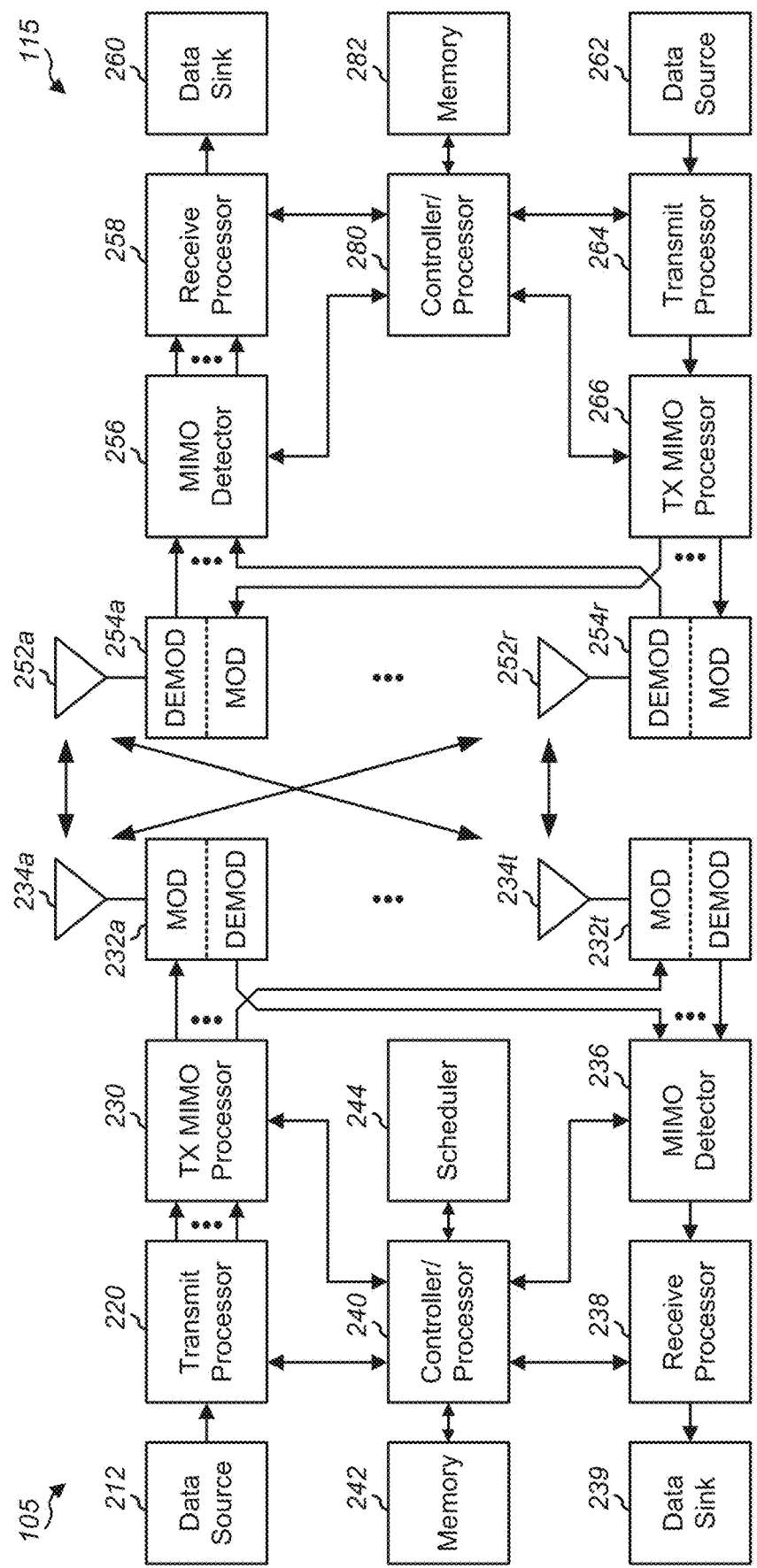
FIG. 2 is a block diagram conceptually illustrating a design of a base station and a UE configured according to some aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 6, 9, and 10, or other processes for the techniques described herein. The memories 242 and 282 may store data and program codes for the base station 105 and The UE 115, respectively. Scheduler 244 may schedule UEs for data transmission on the downlink or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
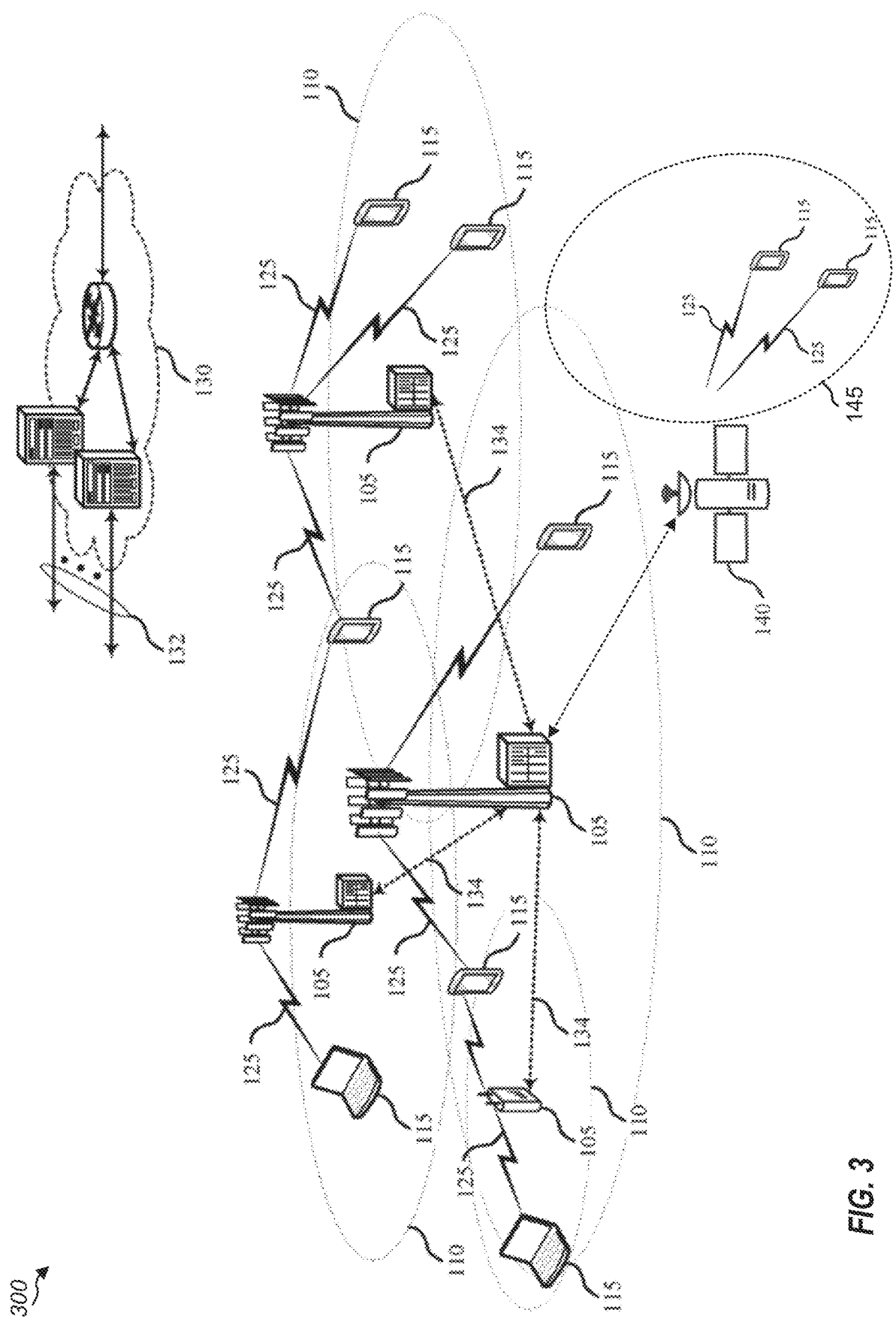
FIG. 3 is a block diagram illustrating details of another wireless communication system according to some aspects.

FIG. 3 illustrates an example of a wireless communications system 300 in accordance with aspects of the present disclosure. Wireless communication system 100 may include or correspond to wireless network 100. The wireless communications system 300 includes base stations 105, UEs 115, and a core network 130. In some examples, the wireless communications system 300 may be a Long Term Evolution (LTE) network, an LTE-Advanced (LTE-A) network, an LTE-A Pro network, or a New Radio (NR) network. In some cases, wireless communications system 300 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, a ground gateway, or some other suitable terminology. Wireless communications system 300 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 300 may include uplink transmissions from a UE 115 to a base station 105, or downlink transmissions from a base station 105 to a UE 115. Downlink transmissions may also be called forward link transmissions while uplink transmissions may also be called reverse link transmissions.

Base stations 105 (or ground gateways) may wirelessly communicate with UEs 115 via one or more platforms 140 (e.g., or high-altitude platforms). The platforms 140 may relay communications between base stations 105 and UEs 115. Each platform 140 may be associated with a geographical area in which communications with various UEs 115 is supported, which may be referred to as a beam footprint 145. Each platform 140 may provide communication coverage for a respective beam footprint 145 via communication links 125, and communication links 125 between a platform 140 and a UE 115 may utilize one or more carriers. Communication links 125 shown in wireless communications system 300 may include uplink transmissions from a UE 115 to a platform 140, or downlink transmissions from a platform 140 to a UE 115. Downlink transmissions may also be called forward link transmissions while uplink transmissions may also be called reverse link transmissions. A beam footprint 145 may be an area associated with a transmission beam of a platform 140. In some cases, platform 140 may be a high-altitude platform, a satellite, a space station, an aircraft, or any orbital or suborbital device capable of performing wireless communications (e.g., with a UE 115 or base station 105).

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 300, and each UE 115 may be stationary or mobile. Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130). Base stations 105 may communicate with platforms 140 wirelessly over backhaul links 134 (e.g., via an X2 or other interface).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 300 may operate using one or more frequency bands which may be in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 300 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 300 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 300 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, or NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 4:
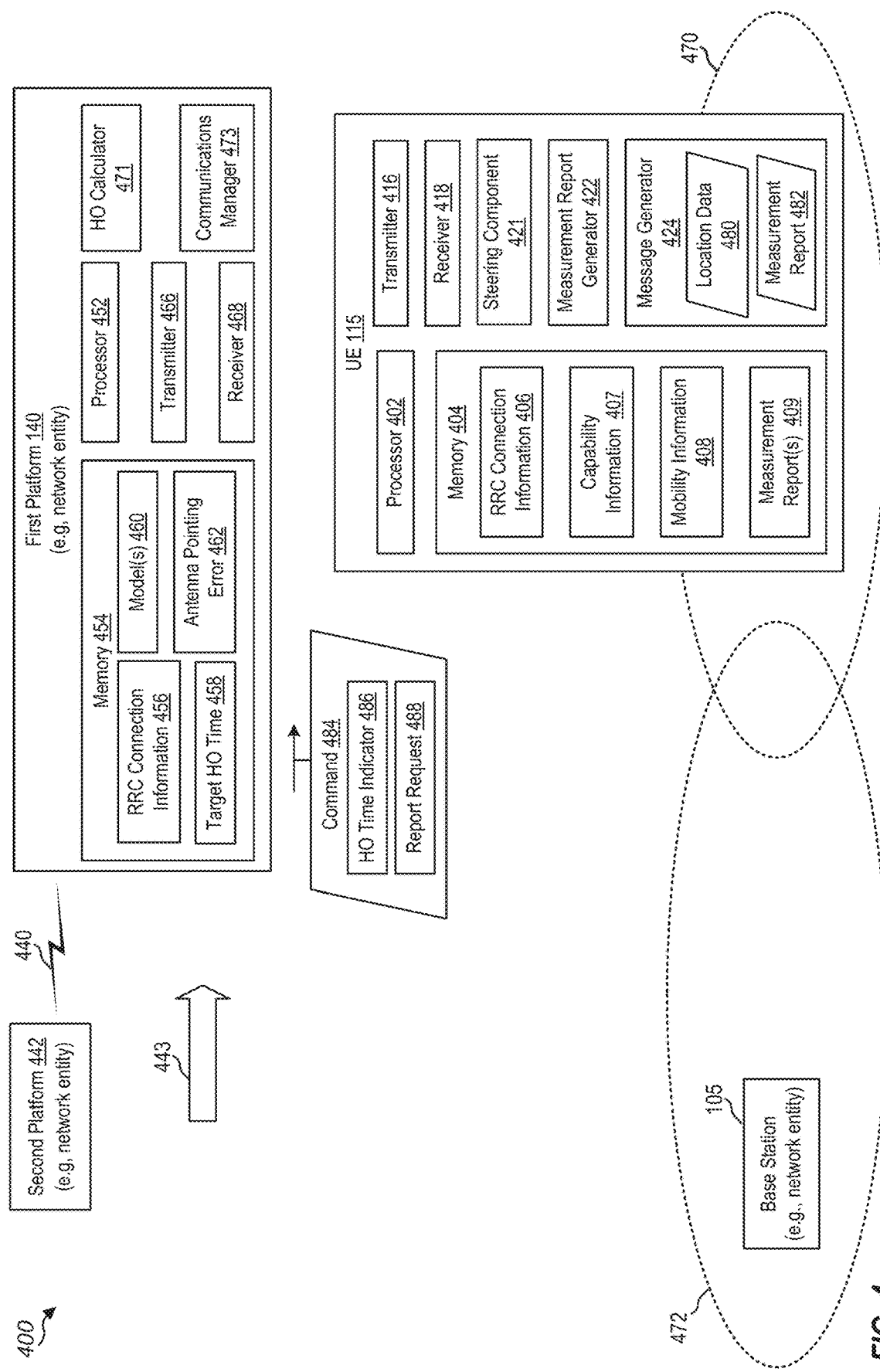
FIG. 4 is a block diagram illustrating details of another wireless communication system according to some aspects.

FIG. 4 is a block diagram of an example wireless communications system 400 for a handover in an NTN network. In some examples, wireless communications system 400 may implement aspects of wireless communication system 100, 300. For example, wireless communications system 300 may include UE 115 and one or more network entities, such as one or more base stations 105, and one or more platforms—e.g., a first platform 140 and a second platform 442. Base stations 105 may utilize platforms 140 to relay communications to UEs 115.

The one or more platforms may include one or more airborne platforms, such as one or more satellites located in orbit with respect to Earth. To illustrate, each of platforms 140, 442 may relay communications between base stations (e.g., a gateway) and mobile terminals (e.g., UE 115) that are located on Earth. The geographical area associated with a transmission beam of a platform 140, 442 may be called a beam footprint and UE 115 may communicate with a platform (140, 442) when UE 115 is located within a beam footprint of the network entity. As shown, system 400 includes a first beam having a first beam footprint 470 and a second beam having a second beam footprint 472. The first beam may originate from first platform 140, and the second beam may originate from first platform 140 or second platform 442.

UE 115 can include a variety of components (e.g., structural, hardware components) used for carrying out one or more functions described herein. For example, these components can include a processor 402, a memory 404, a transmitter 416, a receiver 418, a steering component 421, a measurement report generator 422, and a message generator 424. Processor 402 may be configured to execute instructions stored at memory 404 to perform the operations described herein. In some implementations, processor 402 includes or corresponds to controller/processor 280, and memory 404 includes or corresponds to memory 282. In addition to the instructions stored at memory 404, memory 404 may be configured to store RRC connection information 406, capability information 407, mobility information 408, and one or more measurement reports 409.

The RRC connection information 406 may include RRC connection request information, RRC connection setup information, or RRC connection reconfiguration information. Additionally, or alternatively, the RRC connection information 406 may include information corresponding to one or more beam, one or more UEs, or a combination thereof. To illustrate, the RRC connection information 406 may include one or more parameters of a beam, such as a frequency, a modulation coding scheme, a propagation delay, or a combination thereof, as illustrative, non-limiting examples. In some implementations, the RRC connection information 406 may include one or more indicators, one or more identifiers, or a combination thereof. For example, the RRC connection information 406 may include or correspond to a UE identifier, a first beam identifier, a second beam identifier, or a combination thereof, and may indicate or identify which UEs are communicatively coupled to which beams. The one or more identifiers may.

Capability information 407 may include or indicate one or more capabilities of UE 115. For example, capability information 407 may include or indicate a steering type, a mechanically steered type or an electronically steered type, of an antenna of UE 115. Additionally, or alternatively, capability information 407 may include or indicate a HO delay associated with the particular type. The HO delay may include or correspond to an inter-platform HO delay ("an inter-satellite HO delay"), an intra-platform HO delay ("an intra-satellite HO delay"), or a combination thereof. It is noted that a delay of an inter-platform HO may be greater than a delay of an intra-platform HO. For example, the inter-platform HO delay may include or correspond to a UE antenna repointing delay and a communication delay (e.g., how to exchange the control signaling, how to decode a signal from the network, etc.). The intra-platform HO delay may include or correspond to a communication delay.

Mobility information 408 may include or indicate a location of UE 115, a mobility (e.g., stationary or movable) of UE 115, a speed, a path or route of travel, an altitude, or a combination thereof. The one or more measurement reports 409 may include one or more measurement reports, such as such as a measurement report 482, generated by measurement report generator 422, as described further herein.

Transmitter 416 is configured to transmit data to one or more other devices, and receiver 418 is configured to receive data from one or more other devices. For example, transmitter 416 may transmit data, and receiver 418 may receive data, via a wireless network. In some implementations, transmitter 416 and receiver 418 may be replaced with a transceiver. Additionally, or alternatively, transmitter 416, receiver 418, or both may include or correspond to one or more components of UE 115 described with reference to FIG. 2.

Steering component 421 may be configured to steer or move an antenna of UE 115 or direct/redirect (e.g., configure/reconfigure) a beam of the antenna. Steering component 421 may be mechanical, electrical, or a combination thereof.

Measurement report generator 322 may generate a measurement report. For example, measurement report generator 322 may generate measurement report 482, a measurement reported included in measurement reports 409, or a combination thereof. To illustrate, measurement report generator 322 may measure one or more frequencies to determine the downlink signal strength and/or the down link signal quality of the first beam at a first time prior to or during the HO procedure, measure the downlink signal strength and/or the down link signal quality of the subsequent beam at a second time during or subsequent to the HO procedure. The measurement report generator 322 may generate the measurement report 482 based on or to include the measured data. UE 115 may store the measurement report at memory 304 as part of the one or more measurement reports 309, may be configured to monitor one or more frequencies.

Message generator 424 is configured to generate one or more messages for communication, such as wireless transmission, by UE 115 as described herein. The one or more messages may include information or data, such as location data 480 corresponding to UE 115, measurement report 482, or a combination thereof, as illustrative, non-limiting examples.

In some implementations, UE 115 may include a GPS to determine location data 480. Additionally, or alternatively, UE 115 may receive location data 480 from another device, such as a nearby device that includes a GPS. In some implementations, UE 115 may derive location data 480 using one or more NTN signals.

Base station 105 may be include or correspond to a network entity, such as an Earth ground station. In some implementations, base station 105 includes or corresponds to a first cell and base station 305 includes or corresponds to a second cell. Although not shown, base station 105 may include one or more components, such as a processor, a memory, a transmitter, a receiver, or a combination thereof, as illustrative, non-limiting examples. Additionally, or alternatively, base station 105 may include one or more components as described with reference to FIG. 2. An example of base station 105 is described further herein at least with reference to network entity 601 of FIG. 12.

First platform 140 can include a variety of components (e.g., structural, hardware components) used for carrying out one or more functions described herein. For example, these components can include a processor 452, a memory 454, a transmitter 466, a receiver 468, a handover (HO) calculator 471, and a communications manager 473. Processor 452 may be configured to execute instructions stored at memory 454 to perform the operations described herein. In some implementations, processor 452 includes or corresponds to controller/processor 240, and memory 454 includes or corresponds to memory 242. In addition to the instructions stored at memory 454, memory 454 may be configured to store RRC connection information 456, a target HO time 458, one or more models 460, and an antenna pointing error 462 (e.g., an antenna pointing error value).

The RRC connection information 456 may include or correspond to RRC connection information 406. Target HO time 458 may include or indicate a time for UE 115 to perform a handover operation to switch from the first beam to the second beam.

The one or more models 460 may include or indicate a flight path or an orbit of one or more platforms 140, 442. Additionally, or alternatively, model(s) 460 may include or indicate a speed of the one or more platforms 140, 442, a contour of a beam footprint 470, 472, the antenna pointing error 462, or a combination thereof.

The antenna pointing error 462 may indicate an error associated a shifted beam footprint. In case of satellite antenna pointing error, caused by satellite maneuver error or satellite antenna manufacturing variation, satellite can request measurement report from the UE's and adjust the pre-determined HO time based on UE measurement. Based on UE measurement reports received, the network can calibrate the satellite antenna pointing error and improve on its estimate of optimal HO time and apply to future HO directives.

Transmitter 466 is configured to transmit data to one or more other devices, and receiver 468 is configured to receive data from one or more other devices. For example, transmitter 466 may transmit data, and receiver 468 may receive data, via a wireless network. In some implementations, transmitter 466 and receiver 468 may be replaced with a transceiver. Additionally, or alternatively, transmitter 466, receiver 468, or both may include or correspond to one or more components described with reference to base station 105 of FIG. 2.

HO calculator 471 may be configured to calculate target HO time 458. For example, HO calculator 471 may determine target HO time 458 based on location data 480 of UE 115, one or more models 460, first beam footprint 470, second beam footprint 472, capability information 407, mobility information 408, or a combination thereof. Additionally, or alternatively, HO calculator 471 may generate an updated HO time based on target HO time 458 and antenna pointing error 462. In some implementations, HO calculator 471 may determine target HO time 458 for UE 115 to perform a HO operation from first beam to second beam independent of a measurement report (e.g., 482) corresponding to the second beam.

Communications manager 473 may control communications to or from first platform and one or more other devices, such as UE 115 or one or more other network entities—e.g, base station 105 or second platform 442.

Second platform 442 may include one or more components described with reference to first platform 140. First platform 140 and second platform 442 may communicate via a communications link 440. First platform 140, second platform 442, or both may move in a direction as indicated by arrow 443. Although system 400 is shown as having two platforms 140, 442, in other implementations, system 400 may have a single platform or more than two platforms.

In some implementations, a network, such as one or more network entities, may determine a time for UE 115 to handover from one beam to another beam based on a location (e.g., location data 480) of UE 115. For example, first platform 140 may determine, based on location data 480, target HO time 458 for UE 115 to handover from first beam (e.g. 470) to second beam (e.g., 472). First platform 140 may determine the time based on the location of UE 115 because a beam of the platform moves on the Earth according to a path or orbit of first platform 140 which move faster than UE 115 such that a mobility of UE 115 may be ignored when determining the HO time. For example, determination of the target HO time 458 may be made for both fixed/stationary UEs and mobile UEs due to the fact that a platform may move at a speed of approximately 7 km/second, while a UE of the highest type mobility is relatively still with respect to the speed of the platform and one or more beams of the platform. In some implementations, UE 115 may report its speed and/or path of travel, and the network may consider such information to determine the target HO time 458. Additionally, the network may determine the time independent of or without receiving measurement report before handover (e.g., 482). It is noted that a measurement report is typically required to determine a handover time in a cellular network.

In some implementations, platform antenna pointing error 462 may be caused by platform maneuver error or platform antenna manufacturing variation. To determine or calculate the antenna pointing error 462, first platform 140 (or other network entity) can request measurement report from one or more UEs and adjust a pre-determined HO time (e.g., 458) or model (e.g., 460) based on the measurement report. For example, first platform 140 may send report request 488 to UE 115 to request UE 115 to generate and/or send measurement report 482. Based on one or more measurement reports received by the network, the network can calibrate the antenna pointing error 462 and improve on an estimate of target HO time 458, such as an optimal HO time. The updated/calibrated antenna pointing error 462 can also be used to determine other target HO times 458.

As described with reference to system 400, a first beam has a first footprint 470 and a second beam has a second footprint 472. The first beam and the second beam may originate from the same platform or from different platforms. When the first and second beams originate from the same platform (e.g., 140), UE 115 may perform an intra-satellite HO. When the first and second beams originate from different platforms (e.g., 140, 424), UE may perform an inter-satellite HO.

Figure 5A:
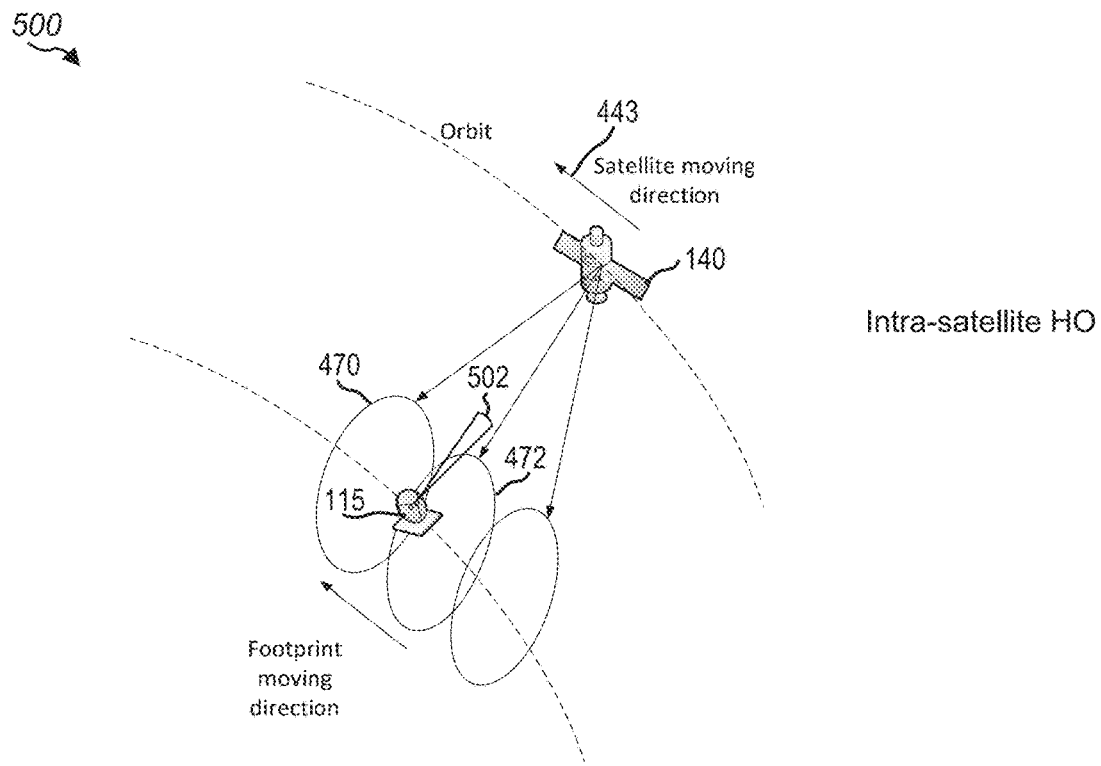
FIGS. 5A and 5B include illustrations of examples of handovers for a NTN according to aspects of the present disclosure.
Figure 5B:
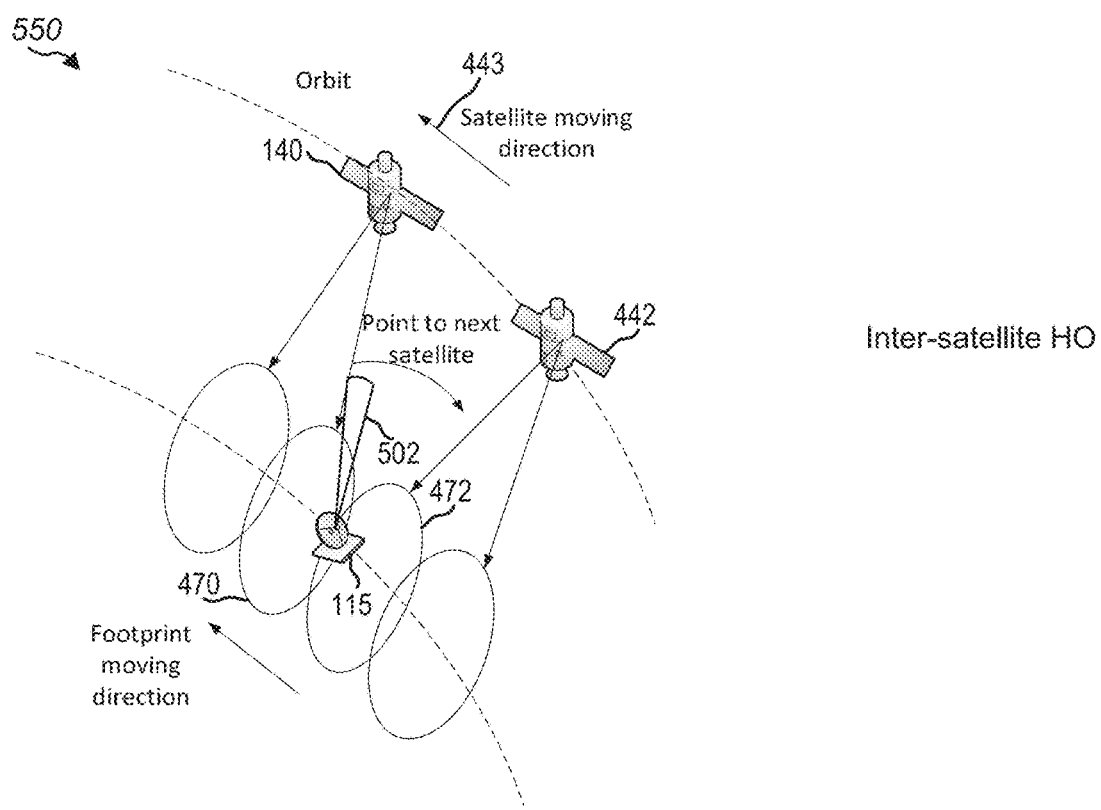

Referring to FIGS. 5A and 5B, examples of handovers for an NTN are shown. For example, FIG. 5A shows a first example 500 of an intra-platform HO (e.g., intra-satellite HO) and FIG. 5B shows a second example 550 of an inter-platform HO (e.g., inter-satellite HO). Referring to the first example 500 of FIG. 5A, first platform 140 is in an orbit and moving in a first direction as indicated by arrow 443. First platform 140 provides first beam having first footprint 470 and second beam having second footprint 472. A moving direction of the first and second footprints 470, 472 is the same as or similar to the moving direction of first platform 140. Additionally, UE 115 is at a location with respect to Earth and is relatively stationary with respect to first platform 140. As shown in the first example 500, UE 115 is performing an intra-platform HO operation and may adjust a carrier frequency of UE 115 from the first beam to the second beam.

Referring to the second example 550 of FIG. 5B, first platform 140 and second platform 442 are in an orbit and moving in a first direction as indicated by arrow 443. First platform 140 provides first beam having first footprint 470 and second platform 442 provides second beam having second footprint 472. A moving direction of the first and second footprints 470, 472 is the same as or similar to the moving direction of first and second platforms 140, 442. Additionally, UE 115 is at a location with respect to Earth and is relatively stationary with respect to first and second platforms 140, 442. As shown in the second example 550, UE 115 is performing an inter-platform HO operation to adjust a direction of an antenna (e.g., a beam 502 of the antenna) of UE 115 from the first beam to the second beam.

Referring to FIG. 4, the network (e.g., one or more network entities) should store and/or track a nominal footprint of the first beam and the second beam—e.g., nominal is what the network believes a beam pattern actually is. However, a real footprint may shift due to platform or antenna manufacturing variation, satellite maneuver bias, etc. The shift of the footprint may affect a HO time for a UE (e.g., 115). The network may be configured to calibrate the shifted beam footprint and make adjustment to the HO time directive. For example, the network may use a signal-to-noise ratio (SNR), a reference signal received power (RSRP), or a combination thereof. In some implementations, the network may receive the SNR, the RSRP, or a combination thereof from a measurement report, such as a measurement report 482 requested from UE 115.

Figure 7:
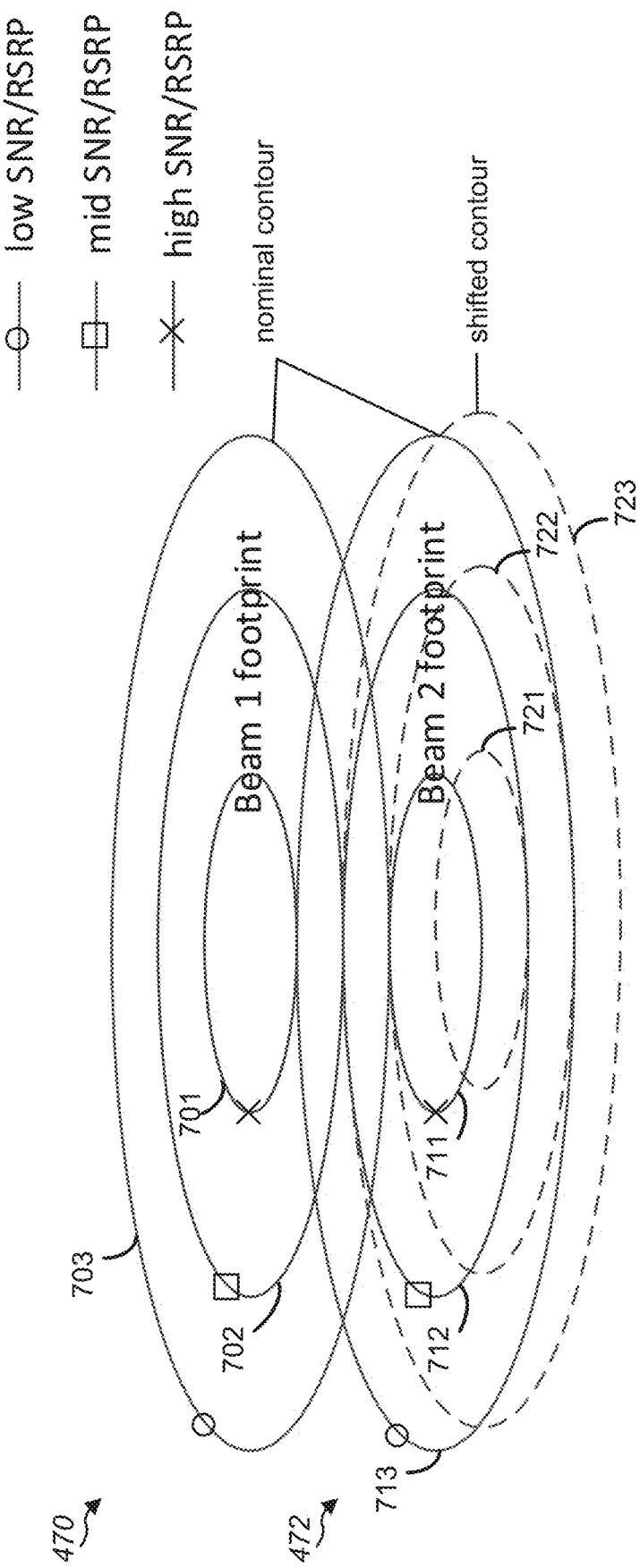
FIG. 7 is an illustration of beam footprints to illustrate an example of a beam shift according to some aspects.

Referring to FIG. 7, an illustration of beam footprints is shown to illustrate an example of a beam shift. For example, first beam footprint 470 ("Beam 1 footprint") and second beam footprint 472 ("Beam 2 footprint") are shown. The first beam footprint 470 is plotted with a high SNR/RSRP 701, a medium SNR/RSRP 702, and a low SNR/RSRP 703. The best quality signal for the first beam corresponds to high SNR/RSRP 701. Near an outer edge of low SNR/RSRP 703, power and/or beam quality may be reduced. The second beam footprint 472 is plotted with a high SNR/RSRP 711, a medium SNR/RSRP 712, and a low SNR/RSRP 713. The best quality signal for the first beam corresponds to high SNR/RSRP 711. Near an outer edge of low SNR/RSRP 713, power and/or beam quality may be reduced.

The nominal contours represent what the network believes the first and second beam footprints to be on the Earth surface. A shifted footprint of the second beam footprint 472 is shown with dashed lines. The shift footprint is plotted with a high SNR/RSRP 721, a medium SNR/RSRP 722, and a low SNR/RSRP 723. The shifted footprint of the second beam may be a result of one or more errors, such as mechanical errors, calibration errors, installation errors, etc. If the network receives one or more reports from UEs along an outer edge of the low SNR/RSRP 732, the network may identify the shifted second beam footprint on Earth. The network can further calibrate the HO by taking into account the contour shift—e.g., the network may accelerate or delay a target HO time.

If a target HO time (e.g., 458) is determined using the nominal contour for the first and second beam footprints 470, 472, a handover procedure may be performed early or late if the first and/or second beam footprints 470, 472 have shifted. Referring to FIGS. 8A-8C, examples of handovers for an NTN are shown. For example, FIG. 8A shows a first example 800 of a target timing for a HO, FIG. 8B shows a second example 840 of an early HO, and FIG. 8C shows a third example 860 of a late HO. In each of the examples, 800, 840, 860, the network determined the target timing for the HO. In the first example 800, the first and second footprints 470, 472 are not shifted. In the second example 840, one of the first and second footprints 470, 472 has shifted such that the HO occurs early. To illustrate, as shown in the third example 860, the HO occurs while the UE 115 is within the first footprint 470 but before the UE 115 is in with the second footprint 472—e.g., a signal strength corresponding to the second footprint 472 is lower than expect.

In the third example 860, one of the first and second footprints 470, 472 has shifted such that the HO occurs late. To illustrate, as shown in the third example 860, the HO occurs after the UE 115 is out of the first footprint 470 and while the UE 115 is already within the second footprint 472—e.g., a signal strength corresponding to the first footprint 472 is lower than expect.

Referring to FIG. 4, the HO calculator 471 may be configured to generate target HO time 458 based on one or more capabilities (e.g., capability information 407) of UE 115. For example, the HO calculator 471 may determine the target HO time 458 based on a HO delay associated with a particular type, such as a mechanically steered type or an electronically steered type, of UE 115. For example, if the UE needs several seconds, such as for mechanically steered type, to transition (e.g., move a beam pattern 502 of an antenna) between beams, the network may determine the target HO time 458 to be early. If the UE uses an electronically steered beam, it may take milliseconds (ms) to switch between beams and the network may delay the target HO time 458.

In some implementations, capability information 407 of UE 115 may include an inter-platform HO delay ("an inter-satellite HO delay"), an intra-platform HO delay ("an intra-satellite HO delay"), or a combination thereof. It is noted that a delay of an inter-platform HO may be greater than a delay of an intra-platform HO. For example, the inter-platform HO delay may include or correspond to a UE antenna repointing delay and a communication delay (e.g., how to exchange the control signaling, how to decode a signal from the network, etc.). The intra-platform HO delay may only include or correspond to communication delay. UE 115 may communicate capability information 407 to the network (e.g., one or more network entities) during an initial registration process. Additionally, or alternatively, UE 115 may communicate capability information 407 to the network (e.g., one or more network entities) after the initial registration process.

In some implementations, the network (e.g., one or more network entities) may transmit a radio resource control (RRC) reconfiguration message to UE 115. The RRC configuration message may include HO time indicator 486 (corresponding to target HO time 4158), target beam information (e.g., a beam identifier, a platform identifier, etc.), an identifier of a UE (to perform the HO), or a combination thereof. In some implementations, the RRC message may include a first field for the HO time indicator, a second field for the target beam information, a third field for the identifier of the UE, or a combination thereof. The first field, the second field, and the third field may be different fields or two or more may be the same field. The RRC configuration message may include or correspond to command 484. In some implementations, the network may transmit the RRC configuration message prior to or during a HO procedure.

In some implementations, the RRC configuration message (e.g., command 484) may include a report request, such as report request 488. For example, the RRC configuration may include a fourth field to include or indicate the report request. The fourth field may be included in the RRC configuration message one of the first, second, or third fields, or in addition to one or more of the first, second, or third fields. The report request may notify to the UE of when to take a measurement (e.g., before, after, or during a HO procedure), a beam to be measured, a time for the measurement, a time to report the measurement (e.g., within an amount of time after the HO), or a combination thereof. The designated measurement time should be a function of the beam geometry and UE location. The resulting measurement reports are used by the network for beam calibration (e.g., to detect and/or determine a footprint shift or antenna pointing error 462). In other implementations, UE 115 may measure and generate a report without receiving a request from the network.

During operation of system 400, UE 115 and a network, such as a network entity (e.g., base station 105, first platform 140, second platform 442, or a combination thereof) may perform one or more operations for NTN communication, to perform HO operations, or a combination thereof. For example, UE 115 may register with NTN and transmit capability information 407, mobility information 408, location data 480, or a combination thereof to the network. After or based on the registration process, UE 115 may be communicatively coupled to first platform 140 via a first beam which originates from first platform 140. In some implementations, UE 115 may communicate with first platform 140 via a single beam.

First platform 140 may transmit command 484 to UE 115. Command 484 may include HO time indicator 486, a report request 488, or a combination thereof. Command 484 may include an RRC configuration message. In some implementations, command 484 may include multiple, separate messages such that HO time indicator 486 is included in a first message and report request 488 is included in a second message. UE 115 may perform a handover operation based on the HO time indicator 486 to switch from the first beam (corresponding to first footprint 470) to the second beam (corresponding to second footprint 472).

Figure 6:
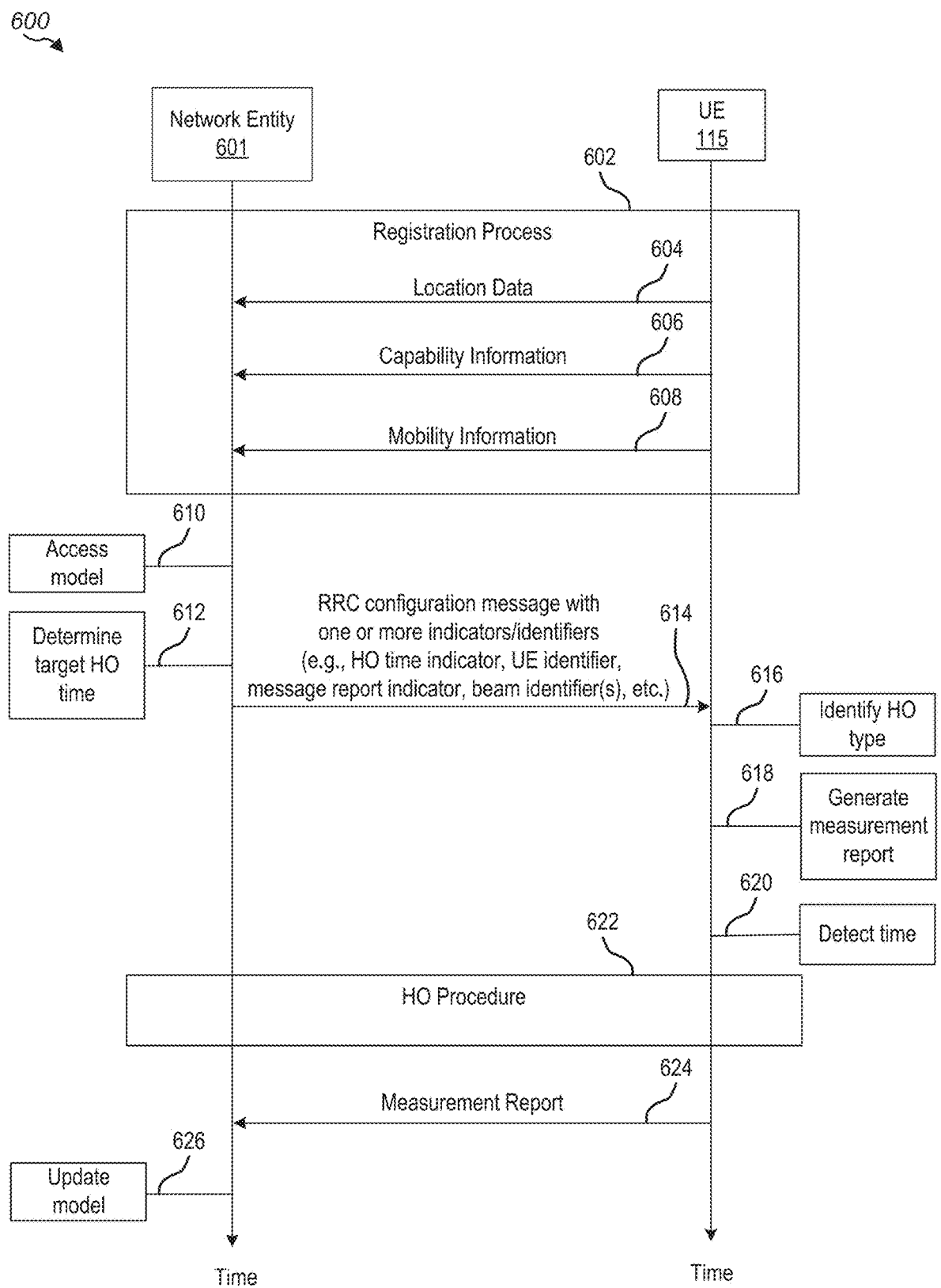
FIG. 6 is a ladder diagrams illustrating an example of a handover for a NTN according to aspects of the present disclosure.

Referring to FIG. 6, a ladder diagrams illustrating an example of a handover for an NTN is shown. As shown in FIG. 6, a system 600 of the ladder diagram includes UE 115 and a network entity 601. System 600 may include or correspond to system 100, system 300, or system 400. Network entity 601 may include or correspond to base station 105, first platform 140, second platform 442, or a combination thereof.

Referring to FIG. 6, during operation of system 400, at 602, UE 115 initiates and performs a registration process. During the registration process (e.g., 602), UE 115 may transmit location data at 604, capability information 606, and mobility information at 608. In some implementations, UE 115 may transmit the location data, the capability information, the mobility information, or a combination thereof based on or responsive to one or more requests received from the network entity 601. For example, UE 115 may transmit the location data responsive to a first request, may transmit the capability information based on a second request, and may transmit the mobility information based on a third request. The location data, the capability information, and the mobility information may include or correspond to location data 480, capability information 407, and mobility information 408, respectively. Although each of the location data, the capability information, and the mobility information are shown as being transmitted during the registration process (e.g., 602), one or more of the location data, the capability information, or the mobility information may be transmitted after the registration process.

At 610, network entity 601 accesses a model corresponding to a platform, such as a platform from which the first beam originates, a platform from which the second be originates, or a combination thereof. The model may include or correspond to the one or more models 460.

At 612, network entity 601 determines target HO time. The target HO time may include or correspond to target HO time 458. For example, network entity 601 may determine the target HO time based on the model, the location data, the capability information, the mobility information, or a combination thereof. In some implementations, network entity 601 may use HO calculator 471 to determine the target HO time.

At 614, network entity 601 transmits a RRC configuration message to UE 115. The RRC configuration message may be generated based on or using RRC connection information 456. The RRC configuration message may include or correspond to command 484. The RRC connection information may include one or more indicators, one or more identifiers, or a combination thereof. The one or more indicators may include or correspond to a HO time indicator (e.g., 486), a message report indicator (e.g., 488), a HO type indicator, or a combination thereof. The one or more identifiers may include or correspond to a UE identifier, a first beam identifier, a second beam identifier, or a combination thereof.

At 616, UE 115 identifies HO type. The HO type may be an intra-platform (e.g., intra-satellite) handover or an inter-platform (e.g., inter-satellite) handover. The HO may be determined based on the RRC configuration message. For example, UE 115 may determine the HO type based on a HO type indicator. Additionally, or alternatively, UE 115 may determine the HO type based on a source beam identifier (e.g., the first beam identifier) and a target beam identifier (e.g., a second beam identifier).

At 618, UE 115 generates a measurement report. The measurement report may include or correspond to measurement report 482. UE 115 may generate the measurement report based on or independent of the RRC configuration message. For example, UE 115 may monitor one or more beams and generate the measurement report based on a message report indicator (e.g., 488) included in a command messages, such as the RRC configuration message, or based on the HO time indicator. As another example, UE 115 may determine the measurement report periodically—e.g., independent of the RRC configuration message.

At 620, UE 115 detects a time corresponding to the HO time indicator and, at 622, UE 115 performs a HO procedure. For example, UE 115 may perform the HO procedure between a first platform, a second platform, network entity 601, or a combination thereof. To illustrate, the UE 115 may perform the HO procedure to transfer the UE from the first beam to the second beam.

At 622, UE 115 transmits the measurement report to network entity 601. Although the measurement report is described as being transmitted after the HO procedure (at 622) in other implementations, UE 115 may transmit the measurement report prior to initiating the HO procedure or during the HO procedure.

At 626, network entity 601 may generate an updated model. The updated model may include or correspond to one or more models 460. The network entity 601 may update one or more target HO times that have yet to occur based on the updated model. For example, the measurement report may correspond to a signal quality of the second beam and, based on the measurement report, the network entity 601 may generate an updated model and/or an antenna pointing error (e.g., 462). Based on the updated model and/or the antenna pointing error, network entity may update one or more target HO times for UEs. For example, the updated target HO time may correspond to a HO operation by a UE to switch from the first beam, to the first beam, from the second beam, or to the second beam.

Thus, FIGS. 4-8 illustrate operations between a UE 115 and a network entity (e.g., 601) for HO operations. The operations described herein provide a HO process (e.g., a NTN HO process) to reduce overhead associated with HO for fast moving platforms, such as a satellite (SAT) moving at 7 kilometers (km)/second, while maintaining high mobility performance. By utilizing a fixed beam pattern and/or a model of the beam pattern and travel path, the NTN (e.g., one or more network entities) can determine when beam crossover should occur and derive a HO time for the UE without needing to receive a measurement report from the UE. It is noted that the UE measurement report may be useful to enable the network to calibrate network's knowledge of an individual beam pattern(s).

Figures 9, 10:
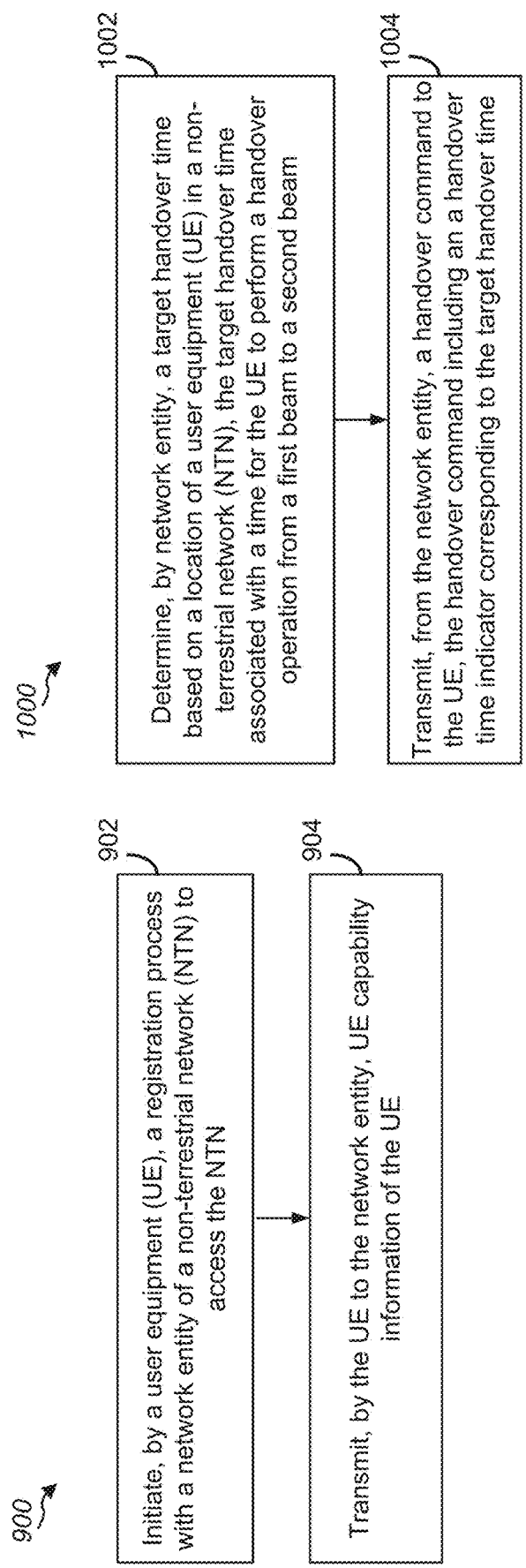
FIG. 9 is a flow diagram illustrating example blocks executed by a UE according to some aspects.
FIG. 10 is a flow diagram illustrating example blocks executed by a UE according to some aspects.
Figure 11:
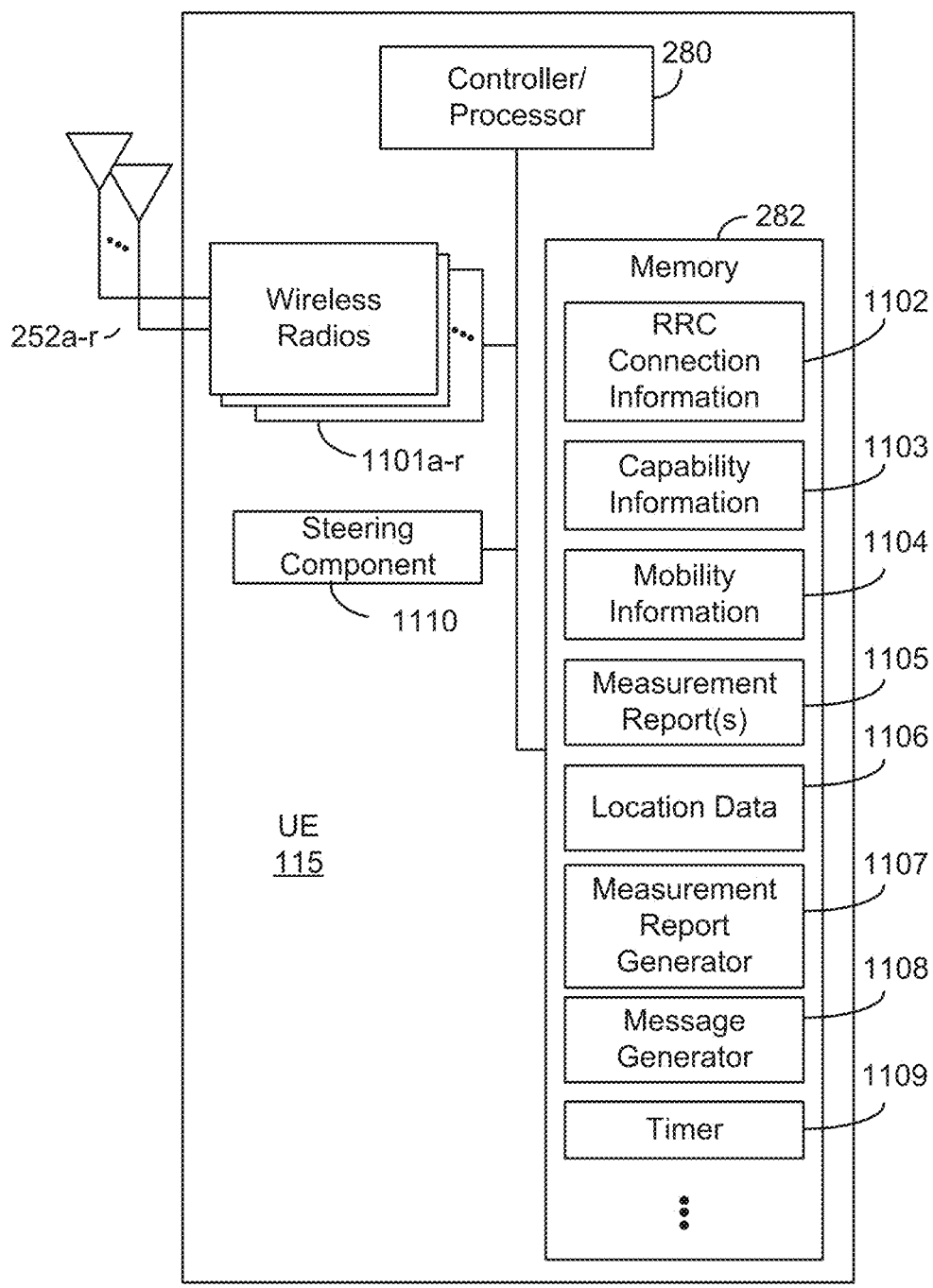
FIG. 11 is a block diagram conceptually illustrating a design of a network entity configured for wireless communication via a NTN according to some aspects.

FIG. 9 is a flow diagram illustrating an example method 900 performed by a UE for communication. For example, example blocks of method 900 may cause UE to communicate via a NTN according to some aspects of the present disclosure. The example blocks will also be described with respect to UE 115 as illustrated in FIG. 11. FIG. 11 is a block diagram conceptually illustrating an example design of a UE configured to communicate via an NTN according to one aspect of the present disclosure. UE 115 includes the structure, hardware, and components as illustrated for UE 115 of FIG. 2 or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101a-r and antennas 252a-r. Wireless radios 1101a-r includes various components and hardware, as illustrated in FIG. 2 for UE 115, including modulator/demodulators 254a-r, MIMO detector 256, receive processor 258, transmit processor 264, and TX MIMO processor 266. UE 115 may also include steering component 1110. Steering component 1110 may be configured to adjust an antenna of antennas 252a-r. Steering component 1110 may include or correspond to steering component 420.

Figure 12:
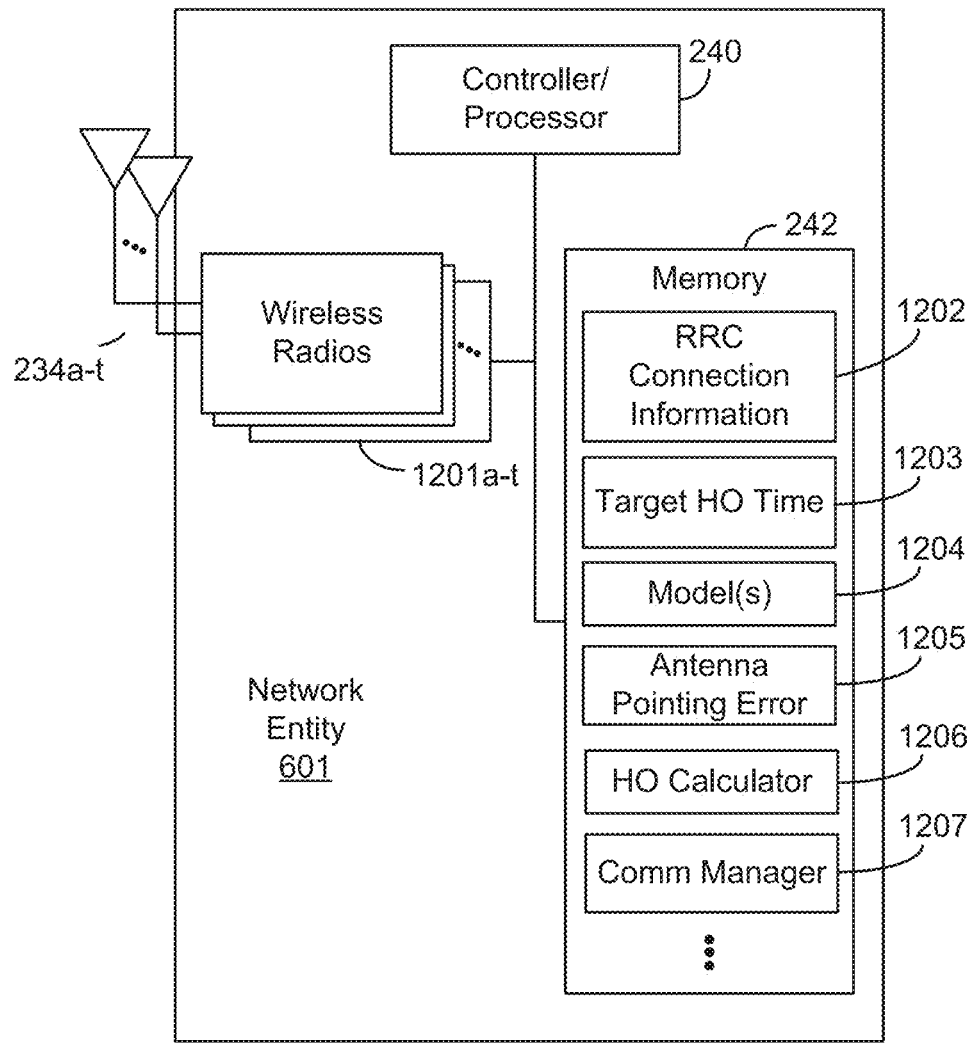
FIG. 12 is a block diagram conceptually illustrating a design of a network entity configured for wireless communication via a NTN according to some aspects.

As shown, memory 282 may include RRC connection information 1102, capability information 1103, mobility information 1104, one or more measurement reports 1105, location data 1106, a measurement report generator 1107, a message generator 1108, and a timer 1109. RRC connection information 1102, capability information 1103, mobility information 1104, one or more measurement reports 1105, and location data 1106 may include or correspond to RRC connection information 406, capability information 407, mobility information 408, one or more measurement reports 409, and location data 480, respectively. Measurement report generator 1107 and message generator 1108 may include or correspond to measurement report generator 422 and message generator 424, respectively. Timer 1109 may be configured to enable UE 115 to identify a time corresponding to a handover time indicator (e.g., 486). In some aspects, measurement report generator 1107, message generator 1108, timer 1109, or a combination thereof, may include or correspond to processor(s) 302. UE 115 may receive signals from and/or transmit signal to a network entity, such as base station 105, first platform 140, or second platform 442, as illustrated in FIG. 12.

Referring to FIG. 9, a sample flow diagram of method 900 of UE operations for communication is shown. In some implementations, method 900 may be performed by UE 115. In other implementations, method 900 may be performed by an apparatus configured for wireless communication. For example, the apparatus may include at least one processor, and a memory coupled to the processor. The processor may be configured to perform operations of method 900. In other implementations, method 900 may be performed or executed using a non-transitory computer-readable medium having program code recorded thereon. The program code may be program code executable by a computer for causing the computer to perform operations of method 900.

As illustrated at block 902, a UE initiates registration process with a network entity of an NTN to access the NTN. For example, the registration process may include or correspond to the registration process 602. The network entity may include or correspond to base station 105, a first platform 140, or a second platform 442.

At 904, UE transmits, to the network entity, UE capability information of the UE. For example, the UE capability information may include or correspond to capability information 1103. In some implementations, the UE capability information is transmitted during the registration process. In some implementations, the UE capability information is transmitted responsive to a request from the network entity. For example, UE 115 may transmit the UE capability information using wireless radios 1101a-r and antennas 252a-r.

The UE capability information indicates a handover delay corresponding to the UE, a steering type, or a combination thereof. The handover delay may be an intra-satellite handover delay (corresponding to an antenna repointing delay of the UE), an inter-satellite handover delay (corresponding to the antenna repointing delay and a communication delay associated with an exchange of control signaling between a two platforms of the NTN), or a combination thereof. The steering type may be a mechanical steering or an electronic steering.

In some implementations, method 900 further includes transmitting, by the UE to the network entity, location data indicating a location of the UE. The location data may include or correspond to location data 1106. The location data may be transmitted during the registration process or after the registration process. Additionally, or alternatively, the location data is transmitted responsive to a request from the network entity. For example UE 115 may transmit the transmit the location data using wireless radios 1101a-r and antennas 252a-r.

In some implementations, method 900 further includes transmitting, by the UE to the network entity, mobility information of the UE. For example, the mobility information may include or correspond to mobility information 1104. To illustrate, the mobility information may include or indicate speed information of the UE, a travel path (e.g., a flight plan, a route, etc.) of the UE, or a combination thereof. In some implementations, the mobility information may be transmitted responsive to a request from the network entity. For example UE 115 may transmit the transmit the mobility information using wireless radios 1101a-r and antennas 252a-r.

In some implementations, method 900 further includes receiving, by the UE from the network entity, a handover command. The handover command may include or correspond to command 484. In some implementations, the handover command includes a handover time indicator associated with a target handover time for the UE to perform a handover operation from a first beam to a second beam. The target handover time may be or indicate an optimal time for the UE to perform the handover operation from the first beam (corresponding to a first platform) to the second beam (corresponding to the first platform or a second platform). The target handover time may be determined based on UE capability information, the location data, the mobility information, a model associated with a flight path of one or more platforms, or a combination thereof. Additionally, or alternatively, the target handover time may be determined independent of a measurement report (e.g., 482) from the UE, The handover time indicator may include or correspond to HO time indicator 486. The measurement report may correspond to a first beam of the first platform.

In some implementations, method 900 further includes performing, by UE, the handover operation with the network entity. The handover operation may be an intra-satellite handover or an inter-satellite handover. For example, the handover operation may include or correspond to handover procedure 622.

In some implementations, method 900 further includes receiving, by the UE, a request for a measurement report from the network entity. The request may include or correspond to report request 488. Additionally, or alternatively, method 900 may include transmitting, by the UE, the measurement report (e.g., 482, 1105). The measurement report may correspond to the second beam. For example, the UE may measure a downlink signal strength of the first beam, a downlink signal quality of the first beam, a downlink signal strength of the second beam, a downlink signal quality of the second beam, or a combination thereof. The measurement report may indicate the downlink signal strength of the first beam, the downlink signal quality of the first beam, the downlink signal strength of the second beam, the down link signal quality of the second beam, or a combination thereof. The UE may transmit the measurement report after performance of the handover operation by the UE to change from the first beam to the second beam. As an example, the UE may measure the downlink signal strength and/or the down link signal quality of the first beam at a first time prior to or during the HO procedure, measure the downlink signal strength and/or the down link signal quality of the subsequent beam at a second time during or subsequent to the HO procedure. The UE may send the measurement report that includes a location of the UE at the first time, a location of the UE at the second time, the downlink signal strength and/or the down link signal quality of the first beam at the first time, the downlink signal strength and/or the down link signal quality of the subsequent beam at the second time, or a combination thereof.

In some implementations, method 900 further includes receiving, by the UE, a radio resource control (RRC) configuration message from the network entity. The RRC configuration message may include or correspond to command 484. The RRC configuration message may include the handover time indicator, an identifier of the UE, a first indication of the first beam, a second indication of the second beam, an indicator to request a measurement report from the UE, or a combination thereof.

Thus, method 900 enables a UE to perform a HO operation in a NTN. For example, the operations described herein provide a HO process (e.g., a NTN HO process) to reduce overhead associated with HO for fast moving platforms.

It is noted that one or more blocks (or operations) described with reference to FIG. 9 may be combined with one or more blocks (or operations) of another of figure. For example, one or more blocks of FIG. 9 may be combined with one or more blocks (or operations) of another of FIG. 2 or 4. Additionally, or alternatively, one or more operations described above with reference to FIGS. 1-4, 6, and 11 may be combine with one or more operations described with reference to FIG. 9.

FIG. 10 is a flow diagram illustrating an example method 1000 performed by a network entity for communication. For example, example blocks of method 1000 may cause network entity to communicate via a NTN according to some aspects of the present disclosure. The example blocks will also be described with respect to UE 115 as illustrated in FIG. 12. FIG. 12 is a block diagram conceptually illustrating an example design of a network entity 601, such as base station 105 or platform 140, 442, configured to provide a handover time indicator to UE 115 according to some aspects of the present disclosure. FIG. 12 may include or correspond to base station(s) 105, platforms 140, 442. Additionally, or alternatively, FIG. 12 (e.g., 601) may include or correspond to the core network 130.

Network entity 601 includes the structure, hardware, and components as illustrated for network entity (e.g., 105, 140, 442) of FIG. 2 or 4. For example, network entity 601 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1201a-t and antennas 234a-t. Wireless radios 1201a-t includes various components and hardware, as illustrated in FIG. 2 for network entity (e.g., 105), including modulator/demodulators 232a-t, transmit processor 220, TX MIMO processor 230, MIMO detector 236, and receive processor 238. As shown, memory 242 may include RRC connection information 1202, a target HO time 1203, one or more models 1204, an antenna pointing error 1205, a HO calculator 1206, and a communications manager 1207. RRC connection information 1202, target HO time 1203, one or more models 1204, antenna pointing error 1205 may include or correspond to RRC connection information 456, target HO time 458, one or more models 460, and antenna pointing error 462, respectively. HO calculator 1206 and a communications manager 1207 may include or correspond to HO calculator 478 and communications manager 473, respectively. In some aspects, HO calculator 1206, a communications manager 1207, or a combination thereof, may include or correspond to processor(s) 452. Network entity 601 may receive signals from and/or transmit signal to a UE, such as UE 115 as illustrated in FIG. 11.

Referring to FIG. 10, a sample flow diagram of method 1000 of network entity operations for communication is shown. In some implementations, method 1000 may be performed by a network entity 601 (e.g., 105, 140, 442). The network entity 601 may include a satellite, a drone, a balloon, an airplane, an airborne platform, or an Earth-based ground station. In other implementations, method 1000 may be performed by an apparatus configured for wireless communication. For example, the apparatus may include at least one processor, and a memory coupled to the processor. The processor may be configured to perform operations of method 1000. In other implementations, method 1000 may be performed or executed using a non-transitory computer-readable medium having program code recorded thereon. The program code may be program code executable by a computer for causing the computer to perform operations of method 1000.

As illustrated at block 1002, method 1000 includes a network entity (e.g., NTN entity) of a NTN network determining a target handover time based on a location of a UE in the NTN. The target handover time may be associated with a time for the UE to perform a handover operation from a first beam to a second beam. The handover operation may include an intra-satellite handover or an inter-satellite handover. Additionally, or alternatively, the target handover time is an optimal time for the UE to perform the handover operation from the first beam (corresponding to a first platform) to the second beam (corresponding to the first platform or a second platform). The target handover time is determined independent of a measurement report (corresponding to the first beam, the second beam, or a combination thereof) from the UE. For example, the target handover time may include or correspond to target HO time 1203. To illustrate, network entity 601 may determine target HO time 1203 using HO calculator 1206.

At 1004, method 1000 further includes the network entity transmitting a handover command to the UE. The handover command may include a handover time indicator corresponding to the target handover time. For example, the handover command and the handover time indicator may include or correspond to command 484 and HO time indicator 486, respectively. For example, network entity 601 may transmit the handover command using wireless radios 1201a-t and antennas 234a-t.

In some implementations, method 900 may further include receiving, by the network entity, location data indicating the location of the UE, mobility information of the UE, or a combination thereof. The location data may include or correspond to location data 480. The mobility information may include or correspond to mobility information 408. The mobility information may include speed information of the UE, a travel path of the UE, or a combination thereof. Additionally, or alternatively, the network entity may receive UE capability information of the UE. The UE capability information may include or correspond to capability information 407. The UE capability information may indicates a handover delay corresponding to the UE, a steering type (a mechanical steering or an electronic steering), or a combination thereof. The handover delay may include an intra-satellite handover delay, an inter-satellite handover delay, or a combination thereof. The intra-satellite handover delay may correspond to an antenna repointing delay of the UE, and the inter-satellite handover delay may correspond to the antenna repointing delay and a communication delay associated with an exchange of control signaling between a first platform of the first beam and a second platform of the second beam. The UE capability information may be received by the network entity responsive to a registration process (e.g., 602) to the NTN performed by the UE. In some implementations, the network entity may determine the target handover time based on a model, such as a model that corresponds to a flight path of one or more platforms. Additionally, or alternatively, the network entity may determine the target handover time based on the mobility information, the location data, the UE capability information, or a combination thereof. The network entity may perform the handover operation with the UE.

In some implementations, method 900 may further include transmitting, by the network entity, a request for a measurement report from the UE. The request may include or correspond to report request 488. For example, network entity 601 may transmit the request using wireless radios 1201a-t and antennas 234a-t. Additionally, or alternatively, the network entity may receive a measurement report (corresponding to the first beam, the second beam, or a combination thereof) from the UE. The measurement report may indicate a downlink signal strength (of the first beam, the second beam, or a combination thereof), a downlink signal quality (of the first beam, the second beam, or a combination thereof), or a combination thereof. In some implementations, the measurement report is received after performance of the handover operation by the UE to change from the first beam to the second beam. For example, network entity 601 may receive the measurement report using wireless radios 1201*a-t* and antennas 234*a-t*.

In some implementations, method 900 may further include determining, by the network entity, an antenna pointing error based on the measurement report from the UE. For example, the antenna pointing error may include or correspond to antenna pointing error 1205. Additionally, or alternatively, the network entity may update, based on the antenna pointing error, a model corresponding to a satellite to generate an updated model. The model, the updated model, or both may include or correspond to the one or more models 1204.

In some implementations, method 900 may further include generating, by the network entity, a radio resource control (RRC) configuration message. The RRC configuration message may include or correspond to command 484. The network entity may generate the RRC configuration message using RRC connection information 1202. The RRC configuration message may include the handover time indicator (e.g., 486), an identifier of the UE, a first indication of the first beam (e.g., 470), a second indication of the second beam (e.g., 472), or a combination thereof.

Thus, method 1000 enables a network entity a UE to coordinate and/or perform a HO operation in a NTN. For example, the operations described herein provide a HO process (e.g., a NTN HO process) to reduce overhead associated with HO for fast moving platforms.

It is noted that one or more blocks (or operations) described with reference to FIG. 10 may be combined with one or more blocks (or operations) of another of figure. For example, one or more blocks of FIG. 10 may be combined with one or more blocks (or operations) of another of FIG. 2 or 4. Additionally, or alternatively, one or more operations described above with reference to FIGS. 1-4, 6, and 11 may be combine with one or more operations described with reference to FIG. 10.

In one or more aspects, techniques for supporting a handover operation may include additional aspects, such as any single aspect or any combination of aspects described below or in connection with one or more other processes or devices described elsewhere herein. In a first aspect, supporting a handover operation may include an apparatus of an NTN configured to determine a target handover time based on a location of a UE in the NTN, the target handover time associated with a time for the UE to perform a handover operation from a first beam to a second beam. The apparatus is further configured to transmit a handover command to the UE, the handover command including a handover time indicator corresponding to the target handover time. Additionally, the apparatus may perform or operate according to one or more aspects as described below. In some implementations, the apparatus includes a wireless device, such as a network entity, such as a satellite, a drone, a balloon, an airplane, an airborne platform, or an Earth-based ground station, or one or more components of a network entity. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the target handover time is determined independent of a measurement report from the UE.

In a third aspect, in combination with the first aspect or the second aspect, the measurement report corresponds to the second beam.

In a fourth aspect, in combination with one or more of the first aspect through the third aspect, the apparatus includes a satellite, a drone, a balloon, an airplane, an airborne platform, or an Earth-based ground station.

In a fifth aspect, in combination with one or more of the first aspect through the fourth aspect, the first beam corresponds to a first platform and the second beam corresponds to the first platform or a second platform.

In a sixth aspect, in combination with one or more of the first aspect through the fifth aspect, the handover operation includes an intra-satellite handover or an inter-satellite handover.

In a seventh aspect, in combination with one or more of the first aspect through the sixth aspect, the apparatus is configured to receive location data indicating the location of the UE.

In an eighth aspect, in combination with one or more of the first aspect through the sixth aspect, the target handover time is further determined based on a model. The model corresponds to a flight path of one or more platforms.

In a ninth aspect, in combination with one or more of the first aspect through the eighth aspect, the apparatus is configured to receive mobility information of the UE.

In a tenth aspect, in combination with the ninth aspect, the mobility information includes speed information of the UE, a travel path of the UE, or a combination thereof.

In an eleventh aspect, in combination with one or more of the first aspect through the tenth aspect, the target handover time is further determined based on the mobility information.

In a twelfth aspect, in combination with one or more of the first aspect through the eleventh aspect, the apparatus is configured to perform the handover operation with the UE.

In a thirteenth aspect, in combination with one or more of the first aspect through the twelfth aspect, the apparatus is configured to transmit a request for a measurement report from the UE.

In a fourteenth aspect, in combination with the thirteenth aspect, the apparatus is configured to receive a measurement report from the UE.

In a fifteenth aspect, in combination with the fourteenth aspect, the measurement report corresponds to the second beam.

In a sixteenth aspect, in combination with one or more of the thirteenth aspect through the fifteenth aspect, the measurement report is received after performance of the handover operation by the UE to change from the first beam to the second beam.

In a seventeenth aspect, in combination with one or more of the first aspect through the sixteenth aspect, the measurement report indicates a downlink signal strength, a downlink signal quality, or a combination thereof.

In an eighteenth aspect, in combination with the sixteenth aspect or the seventeenth aspect, the apparatus is configured to determine an antenna pointing error based on the measurement report from the UE.

In a nineteenth aspect, in combination with the eighteenth aspect, the apparatus is configured to update, based on the antenna pointing error, a model corresponding to a satellite to generate an updated model.

In a twentieth aspect, in combination with one or more of the first aspect through the nineteenth aspect, the apparatus is configured to receive UE capability information of the UE.

In a twenty-first aspect, in combination with one or more of the first aspect through the twentieth aspect, the target handover time is further determined based on the UE capability information.

In a twenty-second aspect, in combination with one or more of the twentieth aspect through the twenty-first aspect, the UE capability information indicates a handover delay corresponding to the UE, a steering type, or a combination thereof.

In a twenty-third aspect, in combination with the twenty-second aspect, the steering type includes a mechanical steering or an electronic steering.

In a twenty-fourth aspect, in combination with the twenty-second aspect or the twenty-third aspect, the handover delay includes an intra-satellite handover delay, an inter-satellite handover delay, or a combination thereof.

In a twenty-fifth aspect, in combination with the twenty-fourth aspect, the intra-satellite handover delay corresponds to an antenna repointing delay of the UE.

In a twenty-sixth aspect, in combination with the twenty-fifth aspect, the inter-satellite handover delay corresponds to the antenna repointing delay and a communication delay associated with an exchange of control signaling between a first platform of the first beam and a second platform of the second beam.

In a twenty-seventh aspect, in combination with one or more of the twentieth aspect through the twenty-sixth aspect, the UE capability information is received by the apparatus responsive to a registration process to the NTN performed by the UE.

In a twenty-eighth aspect, in combination with one or more of the first aspect through the twenty-seventh aspect, the apparatus is configured to generate an RRC configuration message.

In a twenty-ninth aspect, in combination with the twenty-eighth aspect, the RRC configuration message includes the handover time indicator, an identifier of the UE, a first indication of the first beam, a second indication of the second beam, or a combination thereof.

In a thirtieth aspect, in combination with one or more of the twenty-eighth aspect through the twenty-ninth aspect, the RRC configuration message includes an indicator to request a measurement report from the UE after handover to the second beam.

In one or more aspects, techniques for supporting a handover operation may include additional aspects, such as any single aspect or any combination of aspects described below or in connection with one or more other processes or devices described elsewhere herein. In a thirty-first aspect, supporting a handover operation may include an apparatus configured to initiate a registration process with a network entity of a NTN to access the NTN. The apparatus is further configured to transmit to the network entity, UE capability information of the apparatus. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-second aspect, in combination with the thirty-first aspect, the UE capability information is transmitted during the registration process.

In a thirty-third aspect, in combination with the thirty-first aspect or the thirty-second aspect, the UE capability information indicates a handover delay corresponding to the apparatus, a steering type, or a combination thereof.

In a thirty-fourth aspect, in combination with the thirty-third aspect, the UE capability information indicates the handover delay and the steering type.

In a thirty-fifth aspect, in combination with the thirty-third aspect or the thirty-fourth aspect, the steering type includes a mechanical steering or an electronic steering.

In a thirty-sixth aspect, in combination with one or more of the thirty-third aspect through the thirty-fifth aspect, the handover delay includes an intra-satellite handover delay, an inter-satellite handover delay, or a combination thereof.

In a thirty-seventh aspect, in combination with the thirty-third aspect, the intra-satellite handover delay corresponds to an antenna repointing delay of the apparatus.

In a thirty-eighth aspect, in combination with the thirty-seventh aspect, the inter-satellite handover delay corresponds to the antenna repointing delay and a communication delay associated with an exchange of control signaling between a first platform of the NTN and a second platform of the NTN.

In a thirty-ninth aspect, in combination with the thirty-first aspect through the thirty-eighth aspect, the apparatus is configured to transmit, to the network entity, location data indicating a location of the apparatus.

In a fortieth aspect, in combination with the thirty-ninth aspect, the location data is transmitted during the registration process or after the registration process.

In a forty-first aspect, in combination with the thirty-ninth aspect or the fortieth aspect, the location data is transmitted responsive to a request from the network entity.

In a forty-second aspect, in combination with the thirty-first aspect through the forty-first aspect, the apparatus is configured to transmit, to the network entity, mobility information of the apparatus.

In a forty-third aspect, in combination with the forty-second aspect, the mobility information includes speed information of the apparatus, a travel path of the apparatus, or a combination thereof.

In a forty-fourth aspect, in combination with the forty-second aspect or the forty-third aspect, the mobility information is transmitted during the registration process or after the registration process.

In a forty-fifth aspect, in combination with one or more of the forty-second aspect through the forty-fourth aspect, the mobility information is transmitted responsive to a request from the network entity.

In a forty-sixth aspect, in combination with one or more of the forty-second aspect through the forty-fifth aspect, the apparatus is configured to receive, from the network entity, a handover command.

In a forty-seventh aspect, in combination with the forty-sixth aspect, the handover command including a handover time indicator associated with a target handover time for the apparatus to perform a handover operation from a first beam to a second beam.

In a forty-eighth aspect, in combination with one or more of the forty-seventh aspect through the forty-fifth aspect, the target handover time is determined independent of a measurement report from the apparatus.

In a forty-ninth aspect, in combination with the forty-eighth aspect, the measurement report corresponds to the second beam.

In a fiftieth aspect, in combination with one or more of the forty-seventh aspect through the forty-ninth aspect, the first beam corresponds to a first platform and the second beam corresponds to the first platform or a second platform.

In a fifty-first aspect, in combination with one or more of the forty-seventh aspect through the fiftieth aspect, the handover operation includes an intra-satellite handover or an inter-satellite handover.

In a fifty-second aspect, in combination with one or more of the forty-seventh aspect through the fifty-first aspect, the target handover time is determined based on the UE capability information, the location data, the mobility information, a model associated with a flight path of one or more platforms, or a combination thereof.

In a fifty-third aspect, in combination with the thirty-first aspect through the fifty-second aspect, the apparatus is configured to perform the handover operation with the network entity.

In a fifty-fourth aspect, in combination with the thirty-first aspect through the fifty-third aspect, the apparatus is configured to receive a request for a measurement report from the network entity.

In a fifty-fifth aspect, in combination with the thirty-first aspect through the fifty-fourth aspect, the apparatus is configured to transmit the measurement report.

In a fifty-sixth aspect, in combination with the fifty-fifth aspect, the measurement report corresponds to the second beam.

In a fifty-seventh aspect, in combination with the thirty-first aspect through the fifty-sixth aspect, the measurement report is transmitted after performance of the handover operation by the apparatus to change from the first beam to the second beam.

In a fifty-eighth aspect, in combination with the thirty-first aspect through the fifty-sixth aspect, the apparatus is configured to measure a downlink signal strength of the second beam, a downlink signal quality of the second beam, or a combination thereof.

In a fifty-ninth aspect, in combination with the fifty-eighth aspect, the measurement report indicates the downlink signal strength of the second beam, the downlink signal quality of the second beam, or a combination thereof.

In a sixtieth aspect, in combination with the thirty-first aspect through the fifty-ninth aspect, the apparatus is configured to receive an RRC configuration message from the network entity.

In a sixty-first aspect, in combination with the sixtieth aspect, the RRC configuration message includes the handover time indicator, an identifier of the apparatus, a first indication of the first beam, a second indication of the second beam, an indicator to request a measurement report from the apparatus, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 1-12 described herein include processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
   initiating, by a user equipment (UE), a registration process with a network entity of a non-terrestrial network (NTN) to access the NTN; and
   transmitting, by the UE to the network entity, UE capability information of the UE, the UE capability information indicating a steering type comprising a mechanical steering or an electronic steering.

2. The method of claim 1, wherein the UE capability information is transmitted during the registration process.

3. The method of claim 1, wherein the UE capability information indicates a handover delay corresponding to the UE.

4. The method of claim 3, wherein the handover delay comprises an intra-satellite handover delay, an inter-satellite handover delay, or a combination thereof.

5. The method of claim 4, wherein the intra-satellite handover delay corresponds to an antenna repointing delay of the UE.

6. The method of claim 5, wherein the inter-satellite handover delay corresponds to the antenna repointing delay and a communication delay associated with an exchange of control signaling between a first platform of the NTN and a second platform of the NTN.

7. The method of claim 1, further comprising transmitting, by the UE to the network entity, location data indicating a location of the UE.

8. The method of claim 7, wherein the location data is transmitted during the registration process or after the registration process.

9. The method of claim 7, wherein the location data is transmitted responsive to a request from the network entity.

10. The method of claim 1, further comprising transmitting, by the UE to the network entity, mobility information of the UE.

11. The method of claim 10, wherein the mobility information comprises speed information of the UE, a travel path of the UE, or a combination thereof.

12. The method of claim 10, wherein the mobility information is transmitted during the registration process or after the registration process.

13. The method of claim 10, wherein the mobility information is transmitted responsive to a request from the network entity.

14. The method of claim 1, further comprising:
   receiving, by the UE from the network entity, a handover command; and
   wherein the handover command comprising a handover time indicator associated with a target handover time for the UE to perform a handover operation from a first beam to a second beam.

15. The method of claim 14, wherein the target handover time is determined independent of a measurement report from the UE.

16. The method of claim 15, wherein the measurement report corresponds to the second beam.

17. The method of claim 14, wherein the first beam corresponds to a first platform and the second beam corresponds to the first platform or a second platform.

18. The method of claim 14, wherein the handover operation comprises an intra-satellite handover or an inter-satellite handover.

19. The method of claim 14, wherein the target handover time is determined based on UE capability information, location data, mobility information, a model associated with a flight path of one or more platforms, or a combination thereof.

20. The method of claim 14, further comprising performing, by the UE, the handover operation with the network entity.

21. The method of claim 1, further comprising receiving, by the UE, a request for a measurement report from the network entity.

22. The method of claim 21, further comprising:
   transmitting, by the UE, the measurement report; and
   wherein the measurement report corresponds to a second beam.

23. The method of claim 21, wherein the measurement report is transmitted after performance of a handover operation by the UE to change from a first beam to a second beam.

24. The method of claim 21, further comprising:
measuring, by the UE, a downlink signal strength of a second beam, a downlink signal quality of the second beam, or a combination thereof; and
wherein the measurement report indicates the downlink signal strength of the second beam, the downlink signal quality of the second beam, or a combination thereof.

25. The method of claim 1, further comprising:
receiving, by the UE, a radio resource control (RRC) configuration message from the network entity; and
wherein the RRC configuration message includes a handover time indicator, an identifier of the UE, a first indication of a first beam, a second indication of a second beam, an indicator to request a measurement report from the UE, or a combination thereof.

26. An apparatus configured for wireless communication, the apparatus comprising:
at least one processor; and
a memory coupled to the at least one processor,
wherein the at least one processor is configured to:
initiate, by a user equipment (UE), a registration process with a network entity of a non-terrestrial network (NTN) to access the NTN; and
transmit, by the UE to the network entity, UE capability information of the UE, the UE capability information indicating a steering type comprising a mechanical steering or an electronic steering.

27. The apparatus of claim 26, wherein:
the UE capability information is transmitted during the registration process.

28. The apparatus of claim 26, wherein:
the UE capability information indicates:
a handover delay corresponding to the UE.

29. The apparatus of claim 28, wherein:
the handover delay comprises an intra-satellite handover delay, an inter-satellite handover delay, or a combination thereof.

30. The apparatus of claim 29, wherein:
the inter-satellite handover delay corresponds to the antenna repointing delay and a communication delay associated with an exchange of control signaling between a first platform of the NTN and a second platform of the NTN.

31. The apparatus of claim 26, wherein the at least one processor is further configured to:
transmit, by the UE to the network entity, location data indicating a location of the UE.

32. The apparatus of claim 31, wherein:
the location data is transmitted during the registration process or after the registration process.

33. The apparatus of claim 31, wherein:
the location data is transmitted responsive to a request from the network entity.

34. The apparatus of claim 26, wherein the at least one processor is further configured to:
transmit, by the UE to the network entity, mobility information of the UE.

35. The apparatus of claim 34, wherein:
the mobility information comprises speed information of the UE, a travel path of the UE, or a combination thereof.

36. The apparatus of claim 34, wherein:
the mobility information is transmitted during the registration process or after the registration process.

37. The apparatus of claim 34, wherein:
the mobility information is transmitted responsive to a request from the network entity.

38. The apparatus of claim 26, wherein the at least one processor is further configured to:
receive, by the UE from the network entity, a handover command; and
wherein the handover command comprising a handover time indicator associated with a target handover time for the UE to perform a handover operation from a first beam to a second beam.

39. The apparatus of claim 38, wherein:
the target handover time is determined independent of a measurement report from the UE.

40. The apparatus of claim 39, wherein:
the measurement report corresponds to the second beam.

41. The apparatus of claim 38, wherein:
the first beam corresponds to a first platform and the second beam corresponds to the first platform or a second platform.

42. The apparatus of claim 38, wherein:
the handover operation comprises an intra-satellite handover or an inter-satellite handover.

43. The apparatus of claim 38, wherein:
the target handover time is determined based on UE capability information, location data, mobility information, a model associated with a flight path of one or more platforms, or a combination thereof.

44. The apparatus of claim 38, wherein the at least one processor is further configured to:
perform, by the UE, the handover operation with the network entity.

45. The apparatus of claim 26, wherein the at least one processor is further configured to:
receive, by the UE, a request for a measurement report from the network entity.

46. The apparatus of claim 45, wherein the at least one processor is further configured to:
transmit, by the UE, the measurement report; and
wherein the measurement report corresponds to a second beam.

47. The apparatus of claim 45, wherein:
the measurement report is transmitted after performance of a handover operation by the UE to change from a first beam to a second beam.

48. The apparatus of claim 45, wherein the at least one processor is further configured to:
measure, by the UE, a downlink signal strength of a second beam, a downlink signal quality of the second beam, or a combination thereof; and
wherein the measurement report indicates the downlink signal strength of the second beam, the downlink signal quality of the second beam, or a combination thereof.

49. The apparatus of claim 26, wherein the at least one processor is further configured to:
receive, by the UE, a radio resource control (RRC) configuration message from the network entity; and
wherein the RRC configuration message includes a handover time indicator, an identifier of the UE, a first indication of a first beam, a second indication of a second beam, an indicator to request a measurement report from the UE, or a combination thereof.

50. An apparatus configured for wireless communication, the apparatus comprising:
at least one processor; and
a memory coupled to the at least one processor,
wherein the at least one processor is configured to:
initiate, by a user equipment (UE), a registration process with a network entity of a non-terrestrial network (NTN) to access the NTN; and transmit, by the UE to the network entity, UE capability information of the UE, the UE capability information indicating:
an intra-satellite handover delay that corresponds to an antenna repointing delay of the UE.

\* \* \* \* \*